(12) United States Patent
Joseph

(10) Patent No.: US 10,959,382 B2
(45) Date of Patent: Mar. 30, 2021

(54) MODULAR GROW CHAMBER CONSTRUCTIONS AND RELATED GROWING SYSTEMS AND METHODS

(71) Applicant: Timothy E. Joseph, Las Vegas, NV (US)

(72) Inventor: Timothy E. Joseph, Las Vegas, NV (US)

( * ) Notice: Subject to any disclaimer, the term of this patent is extended or adjusted under 35 U.S.C. 154(b) by 0 days.

(21) Appl. No.: 16/520,038

(22) Filed: Jul. 23, 2019

(65) Prior Publication Data
US 2020/0178476 A1 Jun. 11, 2020

Related U.S. Application Data

(63) Continuation of application No. 16/213,951, filed on Dec. 7, 2018.

(51) Int. Cl.
| | |
|---|---|
| *A01G 9/02* | (2018.01) |
| *A01G 13/02* | (2006.01) |
| *A01G 31/06* | (2006.01) |
| *A01G 2/10* | (2018.01) |

(52) U.S. Cl.
CPC .............. *A01G 9/023* (2013.01); *A01G 2/10* (2018.02); *A01G 13/02* (2013.01); *A01G 31/06* (2013.01)

(58) Field of Classification Search
CPC ...... A01G 2/10; A01G 9/00; A01G 2009/003; A01G 9/02; A01G 9/022; A01G 9/023; A01G 9/12; A01G 13/02; A01G 31/02; A01G 31/06
USPC ............................... 47/65.5, 66.1, 82, 83, 86
See application file for complete search history.

(56) References Cited

U.S. PATENT DOCUMENTS

| | | | |
|---|---|---|---|
| 425,745 A * | 4/1890 | Brown | A01G 9/12 47/47 |
| 3,293,798 A | 12/1966 | Johnson, Sr. | |
| 3,717,953 A | 2/1973 | Kuhn et al. | |
| 4,115,950 A | 9/1978 | Lantai | |
| 4,145,841 A | 3/1979 | Woolpert | |

(Continued)

FOREIGN PATENT DOCUMENTS

| | | |
|---|---|---|
| EP | 0672589 A1 | 9/1995 |
| GB | 2477216 B | 8/2014 |

OTHER PUBLICATIONS

ISR and Written Opinion of Jan. 6, 2017 in Int'l Application No. PCT/US16/56191.

(Continued)

*Primary Examiner* — Lisa L Tsang
(74) *Attorney, Agent, or Firm* — John F. Rollins

(57) ABSTRACT

Growing systems may include a number of modular growing chambers with integrated support columns that eliminate the need for an external support frame and which provide a simple way to remove chambers from a stack for harvesting. The chambers can be assembled around a growing plant. Pins provided on the support columns ensure alignment and provide for easy removal of a lower chamber by first supporting the stack and slightly lowering it relative to the stack. The chamber structure supports harvesting processes that permit harvesting of a chamber simply by shifting it relative to the stack and supporting the other chambers in a vertical position and shifting the chambers. A portable shifting device may provide automated support, shifting and removal of one or more chambers for harvesting.

14 Claims, 27 Drawing Sheets

(56) References Cited

U.S. PATENT DOCUMENTS

| | | | |
|---|---|---|---|
| 4,348,831 A | 9/1982 | Chambers | |
| 4,369,598 A | 1/1983 | Beckwith | |
| 4,736,543 A | 4/1988 | Erdmann | |
| 4,779,378 A | 10/1988 | Mason, Jr. | |
| 4,901,471 A | 2/1990 | Top | |
| 5,136,807 A | 8/1992 | Orlov | |
| 5,404,672 A | 4/1995 | Sanderson | |
| 5,918,415 A | 7/1999 | Locke et al. | |
| 5,930,951 A | 8/1999 | Wong | |
| 6,088,958 A | 7/2000 | Oka et al. | |
| 6,109,011 A | 8/2000 | Iyer et al. | |
| 6,393,764 B1* | 5/2002 | Smith | A01G 9/02 |
| | | | 47/65.5 |
| 6,612,073 B1 | 9/2003 | Powell et al. | |
| 6,681,522 B2* | 1/2004 | Marchioro | A01G 9/027 |
| | | | 47/65.5 |
| 7,080,482 B1 | 7/2006 | Bradley | |
| 7,516,574 B2 | 4/2009 | Gottlieb et al. | |
| 8,424,258 B2* | 4/2013 | Modica | A01G 9/027 |
| | | | 52/285.4 |
| 8,887,439 B2 | 11/2014 | Daas et al. | |
| 9,848,545 B2 | 12/2017 | Joseph et al. | |
| 9,974,252 B2* | 5/2018 | Aykroyd | A01G 31/06 |
| 10,076,090 B2 | 9/2018 | Joseph et al. | |
| 2004/0010971 A1 | 1/2004 | Redfield et al. | |
| 2004/0089657 A1 | 5/2004 | Waszak | |
| 2006/0032128 A1 | 2/2006 | Bryan | |
| 2009/0320367 A1 | 12/2009 | Smith et al. | |
| 2010/0218423 A1 | 9/2010 | Walhovd | |
| 2011/0061296 A1 | 3/2011 | Simmons | |
| 2012/0060416 A1 | 3/2012 | Brusatore | |
| 2012/0167460 A1 | 7/2012 | Omidi | |
| 2012/0186151 A1* | 7/2012 | Daas | A01G 9/028 |
| | | | 47/58.1 R |
| 2012/0279127 A1* | 11/2012 | Yusibov | A01G 31/06 |
| | | | 47/62 N |
| 2013/0067810 A1 | 3/2013 | Kamau | |
| 2013/0111812 A1 | 5/2013 | Fisher | |
| 2013/0160362 A1 | 6/2013 | Daas et al. | |
| 2014/0017043 A1* | 1/2014 | Hirai | A01G 31/02 |
| | | | 414/267 |
| 2014/0075841 A1 | 3/2014 | DeGraff | |
| 2014/0083009 A1 | 3/2014 | Panopoulos et al. | |
| 2015/0096230 A1 | 4/2015 | Ankner | |
| 2015/0101248 A1* | 4/2015 | Adkinson | A01G 27/00 |
| | | | 47/70 |
| 2015/0201563 A1* | 7/2015 | Chiang | A01G 9/028 |
| | | | 47/86 |
| 2015/0223418 A1 | 8/2015 | Collins et al. | |
| 2015/0351328 A1 | 12/2015 | Leigh | |
| 2016/0100530 A1 | 4/2016 | Hwang | |
| 2017/0027110 A1* | 2/2017 | Ito | A01G 9/0299 |
| 2017/0099791 A1* | 4/2017 | Joseph | A01G 31/04 |
| 2017/0347547 A1 | 12/2017 | Lu et al. | |
| 2018/0027753 A1* | 2/2018 | Major | A01G 13/10 |
| 2018/0064048 A1 | 3/2018 | Joseph et al. | |
| 2018/0134508 A1* | 5/2018 | Buell | B65G 65/00 |
| 2018/0338440 A1* | 11/2018 | Dearinger | A01G 9/0297 |
| 2019/0092567 A1* | 3/2019 | Lawrence | A01G 9/143 |
| 2019/0150375 A1* | 5/2019 | Miyahara | A01G 9/143 |

OTHER PUBLICATIONS

International Search Report and Written Opinion in PCT/US2019/65091 dated Apr. 22, 2020.

International Search Report dated Jan. 6, 2017 in PCT/US16/56191, filed Oct. 7, 2016.

Musslewhite, James. "How You Can Grow 100 Pounds of Potatoes in 4 Square Feet", Published May 7, 2014, Living in Cebu Forums, retrieved on Sep. 19, 2019 from https ://www .l ivingincebuforums .com/topic/71220-how-you-can-grow-100-pounds-of-potatoes-in-4-square-feet/ (Year: 2014).

Torpey, Jodi. "Potato box yields scads of spuds", Apr. 7, 2010, The Denver Post, retrieved Sep. 19, 2019 from https://www.denverpost.com/2010/04/07/potato-box-yields-scads-of-spuds/ (Year: 2010).

* cited by examiner

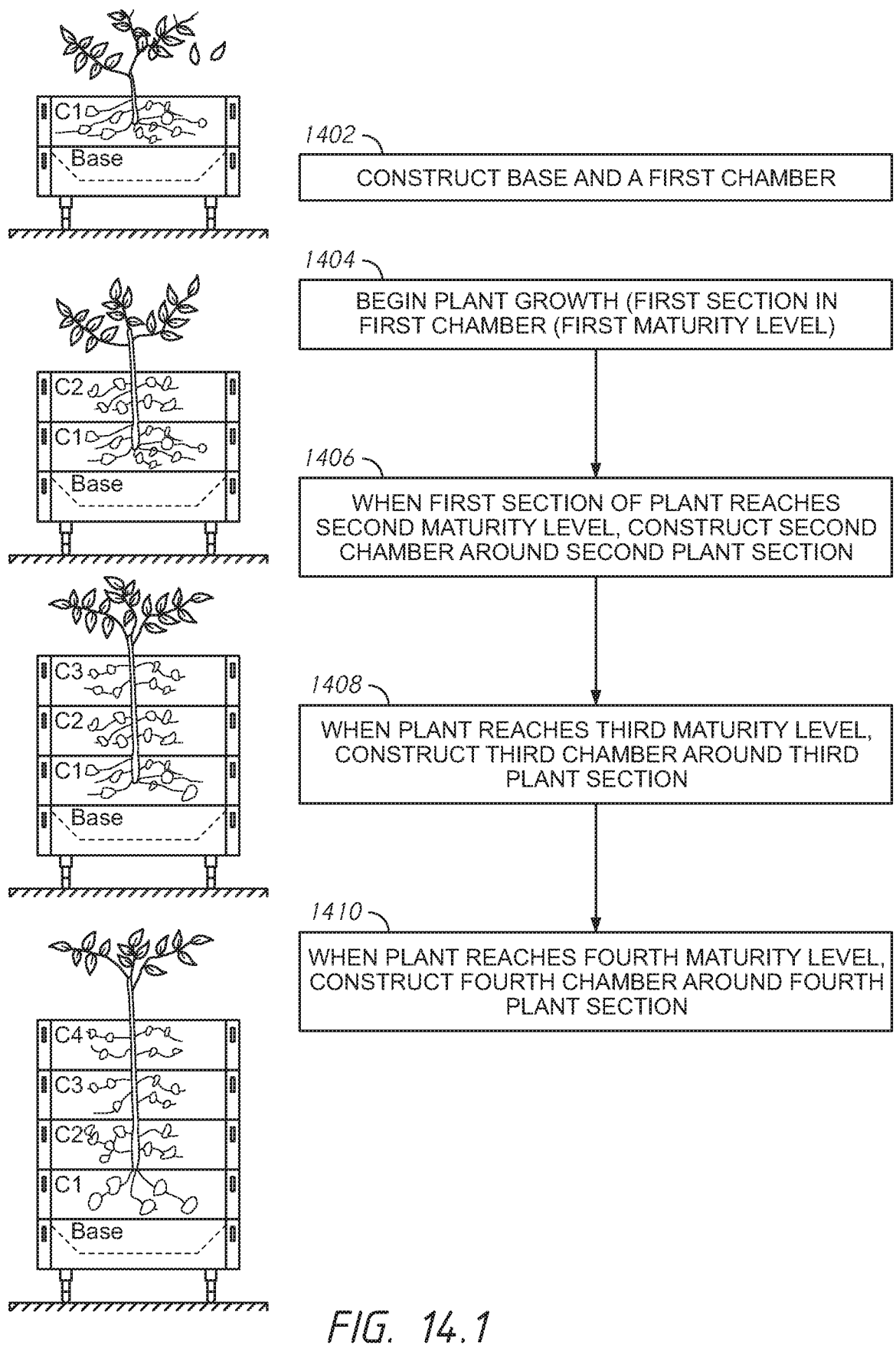
FIG. 14.1

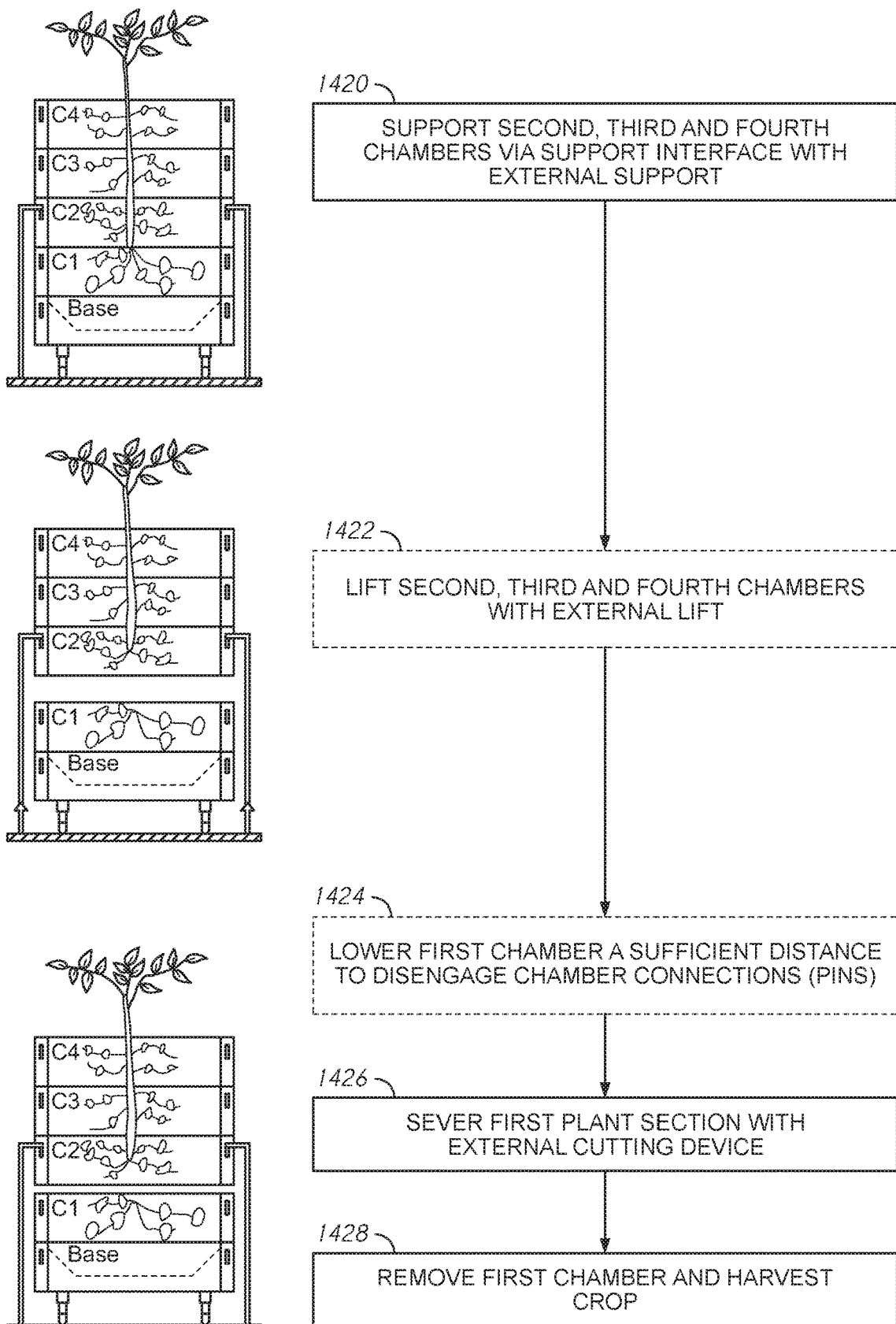
FIG. 14.2

MODULAR GROW CHAMBER CONSTRUCTIONS AND RELATED GROWING SYSTEMS AND METHODS

BACKGROUND

The disclosure relates to construction of grow chambers for growing plants. The disclosure further relates to systems and methods for growing plants, including systems for growing of plants that employ a number of grow chambers in a stacked arrangement and including methods of using such systems to control and enhance plant growth. The disclosure further relates to apparatus and systems for automating the operation of growing systems, including automated components for shifting, lowering, removing or other manipulating of one or more grow chambers in a grow chamber stack.

Recent solutions have addressed challenges in the art to make emerging farming technologies more feasible for mainstream use and production of crops and for adaptation on a wide, commercial scale. For example, U.S. Pat. Nos. 9,848,545 and 10,076,090 to Joseph, et al., the subject matter of which is incorporated herein in its entirety, disclose stacked farming systems and processes which utilize stackable grow chamber systems for controlling the growth of different sections of a single plant. The stack of chambers may surround one or more growing plants, each plant extending within the stack of chambers and having a respective section in each of one or more of the stacked chambers, with each growing chamber surrounding a corresponding portion of the plant, such as a root mass, plant produce, plant stalk, plant canopy, etc. The grow chambers may be selectively added or removed during plant growth, with little to no disruption to the plant, such that different sections of the growing plant may be influenced differently by respective surrounding grow chambers and the unique environment that is created and controlled independently from the other chambers and respective plant sections housed therein. The grow chamber configurations may thus be utilized to manage and control plant growth, productivity, harvesting and prolong the productive life of the plant, thus enabling unique growing and harvesting methods and processes, providing growing systems that are efficient and productive such that the costs associated with operation are justified by the output produced. Such systems provide for increased control and management of plant growth and increase the production (yield), improve the product assortment available from plants, and increase the useful productive life of plants. There are continued challenges in the art to make known growing apparatus, systems and processes more suitable for mainstream and widescale production, transport and use and reduce manufacturing and crop production cost.

There is thus a need in the relevant art for solutions that address the aforementioned challenges and others in the art.

SUMMARY

The present disclosure provides improvements to known grow chamber systems and related methods, including improvements that reduce manufacturing costs, improve transportability of grow chambers and grow chamber systems, provide ease of construction, cleaning, storing and use, and that enhance operation and automation. Additionally, site build-out costs may be reduced, since traditional infrastructure components such as lifts, catwalks, racks, frames or the like can be eliminated or reduced in number by the use of stacked grow system architectures that incorporate aspects of the disclosure.

According to one aspect, grow chamber constructions may incorporate standardized parts that are easy and inexpensive to manufacture and transport and which may be quickly assembled into a grow chamber stack whereby each grow chamber provides a controlled environment for a respective section of a single plant or a number of plants extending through the grow chamber stack. Each chamber may include a grow chamber frame supported on at least two, and preferably four support columns. The chamber frame may define a floor space that may support a number of standardized floor panels, each having at least one plant interface through which the plant may extend such that the floor panels and the chamber may be installed around the plant section without disturbing the plant. The plant interface may engage or abut the plant stalk without damaging it and may create a barrier to keep the plant section substantially isolated within the chamber. The chamber frame may also define a ceiling or lid space for each chamber that may support a number of standardized or customized ceiling or lid panels, which may have the same configuration as the floor panels and may be installed around the plant section without disturbing the plant. Front, back and side panels may be secured to the chamber frame to define an interior space, the environment of which may be controlled, independently of other chambers in the stack, to influence growth of the plant section extending within the grow chamber. The chamber frame and support column construction permit removal of the front, back and side panels without removing the chamber from the stack, thereby allowing maintenance, inspection and servicing of the interior chamber space and plant section therein. Each support column may include an interface which permits any chamber in the stack, or a portion of the stack, to be lifted, lowered and/or supported in a vertical position, allowing removal of one or more chambers for harvesting.

According to another aspect, the support columns, not only may support and/or be integral with the chamber frame components, but may also function as sub-frame components in the chamber stack to permit grow chambers to be stacked upon one another without the need for an external support frame for the overall stack. The support columns may include alignment pins and recesses such that an alignment pin of one support column may be received in a recess of an adjacent support column for an associated chamber. The alignment pins also provide for efficient removal of chambers from the stack in a harvesting operation as a chamber only needs to be moved a small distance to remove the alignment pins from the recesses of an adjacent chamber and to permit severing of the plant section contained in the chamber and removal of the chamber from the stack.

According to another aspect, the chamber construction supports grow chamber systems and processes for constructing the chamber and a chamber stack as the plant grows and without disturbing plant growth. In a growing process, an additional chamber maybe added to a base or an existing grow chamber stack by constructing the new grow chamber on a plant section not under any chamber's control. As an example, this process can be used to modify plant sections from a canopy or light receiving section to a root or crop productive section. Thus, sections of the plant can be enclosed by additional chambers and their growth modified.

According to another aspect, the chamber construction and chamber systems support processes for harvesting successive sections of the plant by easy removal of a desired chamber from the stack.

According to another aspect, a harvesting device may automate or assist manual processes for cutting plant sections and raising, lowering and removal of one or more chambers from the chamber stack for harvesting.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The drawings show example implementations according to respective aspects of the disclosure.

FIGS. 14.1 and 14.2 illustrate an example growing process, including steps and corresponding schematic configurations of the growing system of FIG. 1.

DETAILED DESCRIPTION

Figure 1:
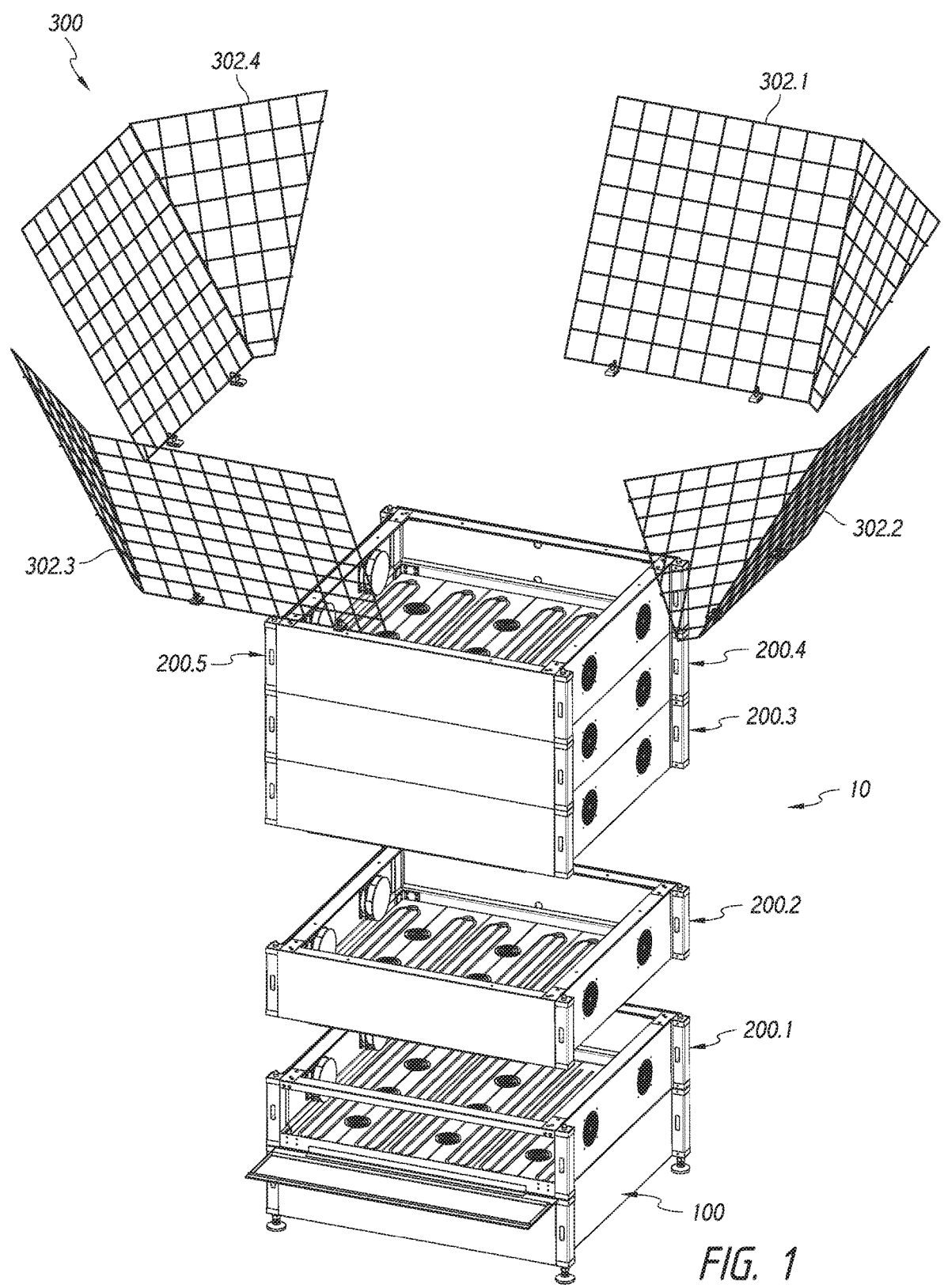
FIG. 1 is an exploded perspective view of an example grow system including a base, plant canopy support assembly and a stack of modular grow chambers, with the stack partially exploded to show additional details.

FIGS. 1-13 illustrate details of an example growing system 10, and constituent parts according to aspects of the disclosure. The grow system 10 may include the major components of a base 100 and a number of (in this case five) grow chambers including a first chamber 200.1, second chamber 200.2, third chamber 200.3, fourth chamber 200.4 and fifth chamber 200.5 in a stacked arrangement. FIG. 1 shows the stack in a partially exploded view to reveal some of the details of the interior of the first and second chambers, which will be further explained herein. A canopy support 300 may comprise a number of (in this case four) canopy support sections 302.1, 302.2, 302.3 and 302.4, which may be fastened to an upper chamber 200.5 with threaded fasteners to surround a plant canopy or shoot section (not shown) extending from the lid of the upper chamber 200.5. The canopy support sections may be constructed as a grid or framework from common materials and may provide support to the plant canopy/shoot section while permitting the circulation of air. As will be described, an upper frame of each chamber may have holes provided thereon to support the canopy support 300.

Figure 2:
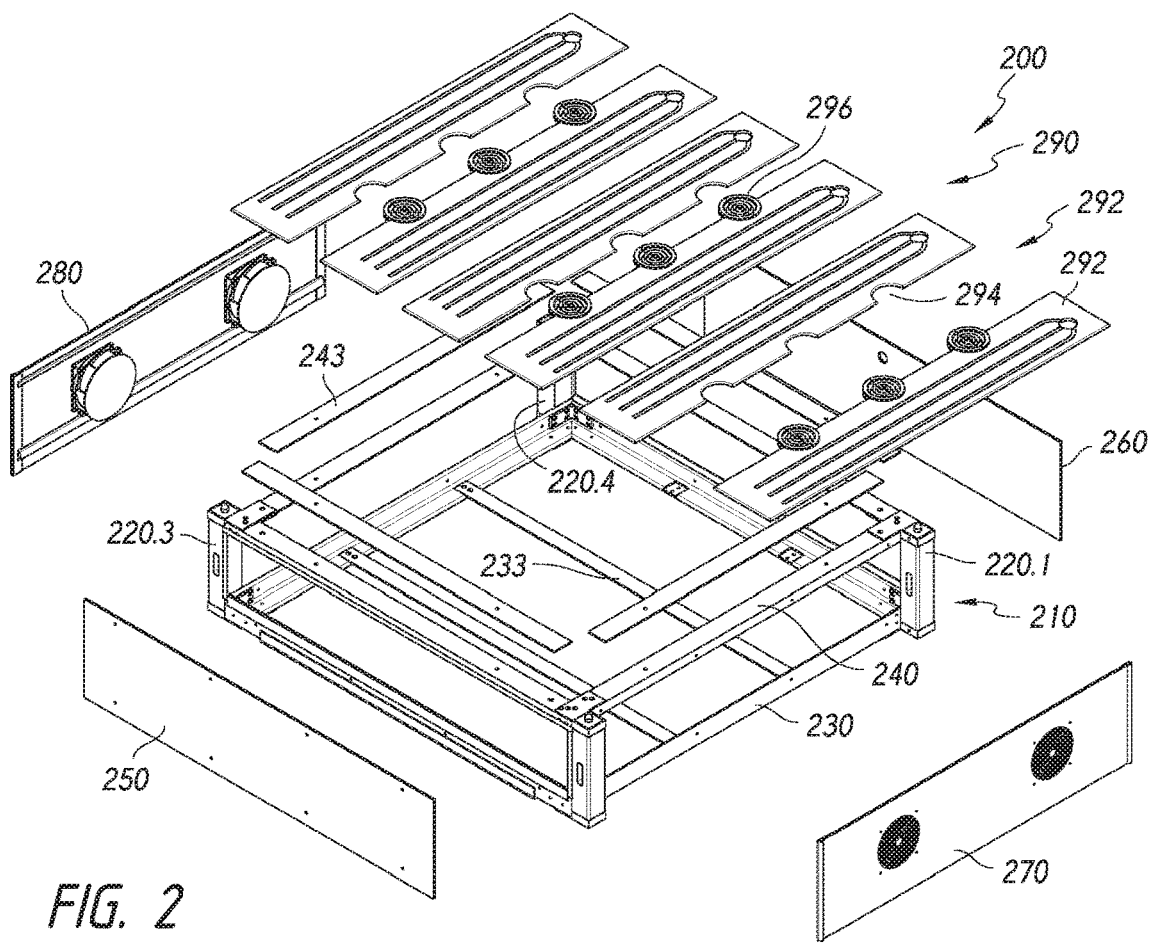
FIG. 2 is an exploded perspective view of an example grow chamber used in the system of FIG. 1.
Figure 3:
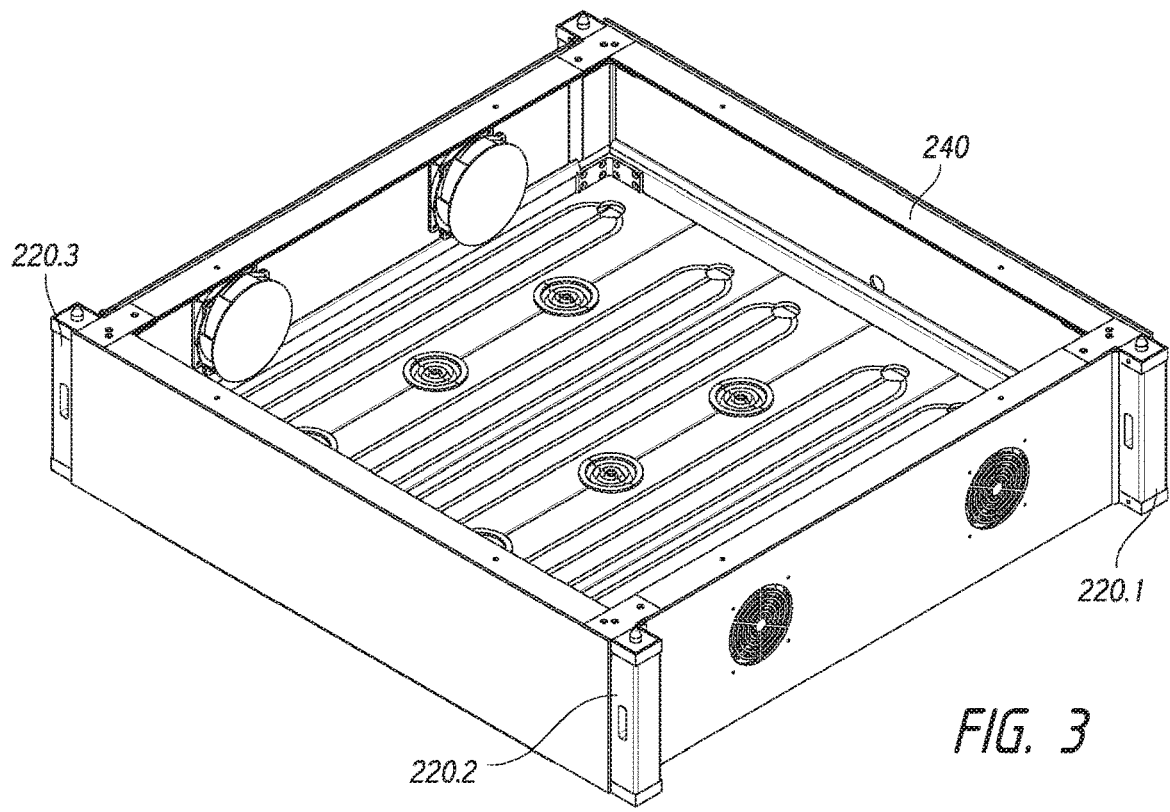
FIG. 3 is a perspective view of the grow chamber of FIG. 2 in an assembled state.

Referring additionally to FIGS. 2 and 3, each grow chamber 200 may be comprised generally of a grow chamber frame 210, which includes at least two, and in this case four, support columns 220.1, 220.2, 220.3 and 220.4. The support columns 220 support and are interconnected with a lower chamber subframe 230 and an upper chamber subframe 240. A front panel 250 and a rear panel 260 may be removably secured to a front and back of the chamber frame 210, respectively. An intake side panel 270 and an exhaust side panel 280 may be removable secured to respective sides of the chamber frame 210 and may include devices for enhancing or causing circulation of air within the chamber, as will be explained. A chamber floor 290 may be formed from a number of (in this case, six) standardized floor panels 292 each having one or more (in this case three) plant interface recesses 294 defined in a side thereof for receiving a plant interface 296, which may engage or abut the plant and may have characteristics of a resilient seal or gasket or include bristles to keep the inner chamber environment controlled independent of other chambers, as will be explained.

Figure 4:
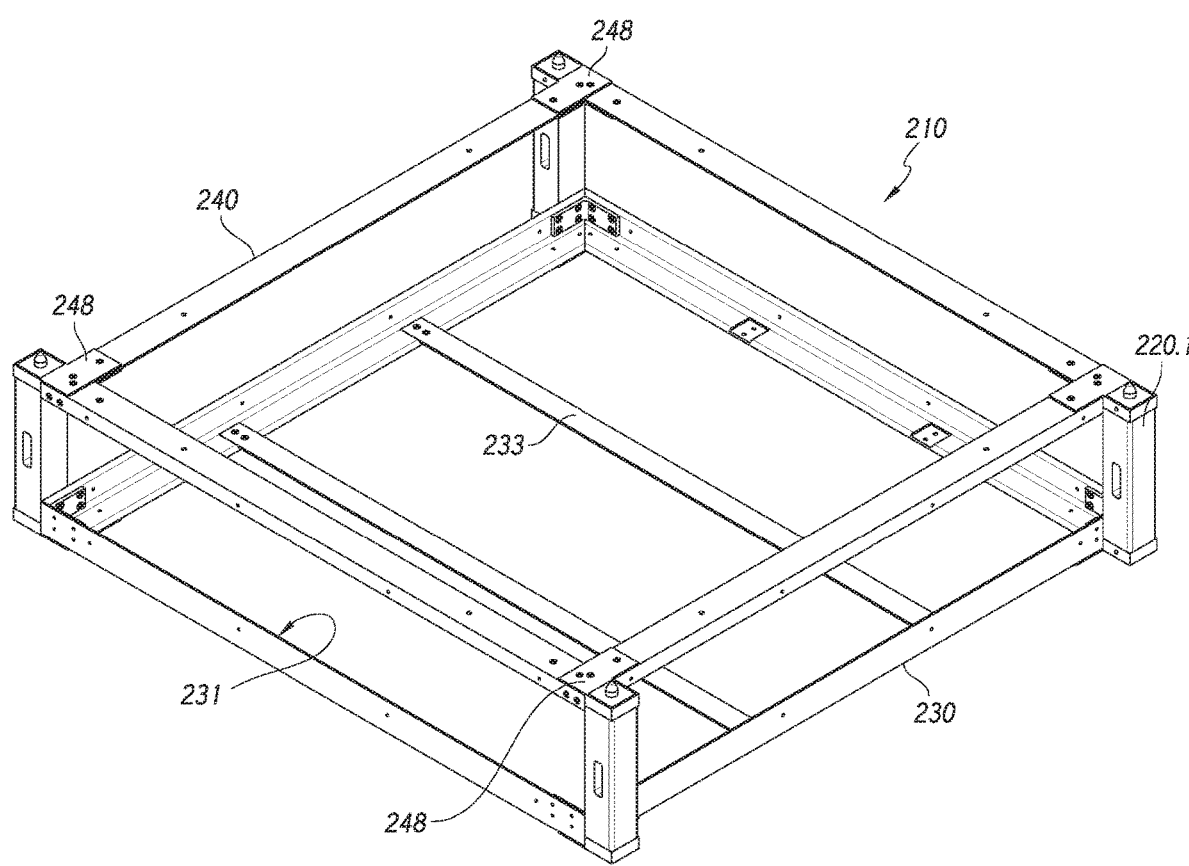
FIG. 4 is a perspective view of an assembled grow chamber frame and vertical supports.
Figure 5:
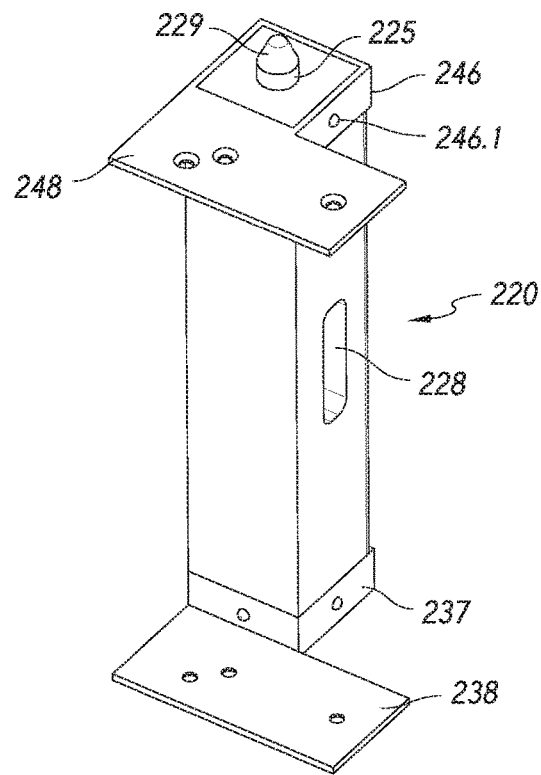
FIGS. 5 and 6 are perspectives 6 showing an example grow chamber support column.
Figure 6:
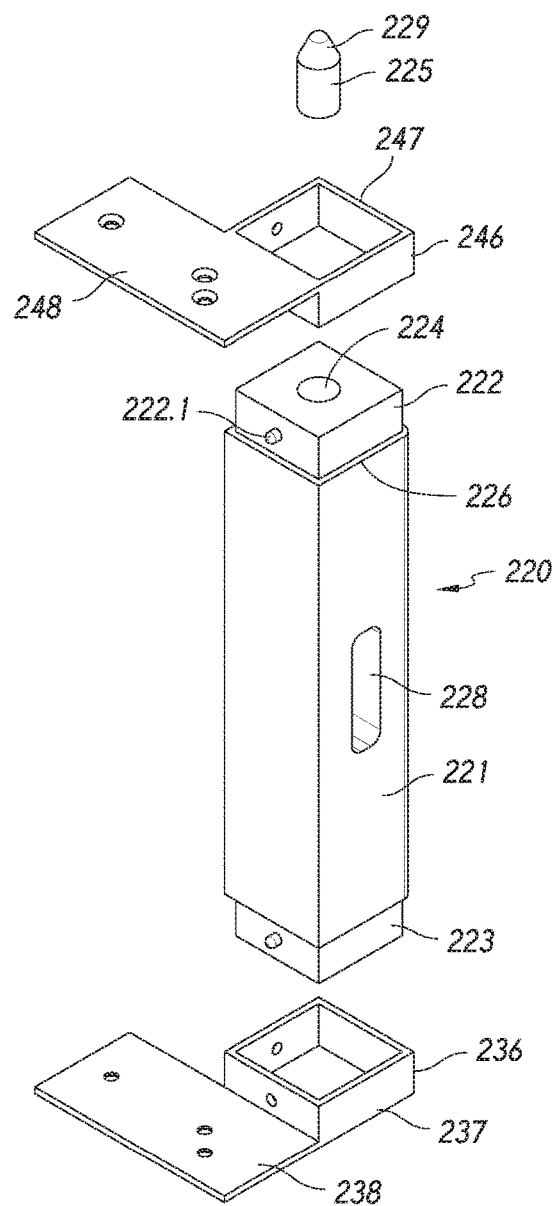

With additional reference to FIGS. 4, 5 and 6, illustrates further details of the constituent components of chamber frame 210 and related structure. Support columns 220 may include a solid main body 221 which may be of a square or other cross-section (i.e., circular, rectangular or any cross-section). A square cross-sectional main body is shown. An upper frame adapter interface 222 is defined on the support column 220 for receiving an upper frame adapter 246. The upper frame adapter interface 222 may include a shoulder 226 formed on the support column 220 for supporting a collar 247 on the upper frame adapter 246. The collar 247 may be shaped complementarily to the upper frame adapter interface 222. An upper frame support plate 248 may extend from the collar 247 to support the upper frame 240. The collar 247 may be retained in place by one or more quick connect fasteners 222.1 which may be a spring-biased pin that retracts into the support column 220 and snap into a respective receiving hole 246.1 defined on collar 246 when the receiving hole 246.1 is aligned with the pin. A lower frame adapter interface 223 may be defined on a lower portion of the support column 220 for receiving a lower frame adapter 236. The lower frame adapter interface 223 may include a shoulder 227 formed on the support column 220 for supporting a collar 237 on the lower frame adapter 236. The collar may be shaped complementarily to the lower frame adapter interface 223. A lower frame support plate 238 may extend from the collar 237 to support the lower frame 230. An interface 228 may be defined in the support column 220 as an elongated slot that extends through the main body of the support column 220 for receiving one or more components of a shifting/lowering/supporting device, as will be described in more detail.

Figure 7:
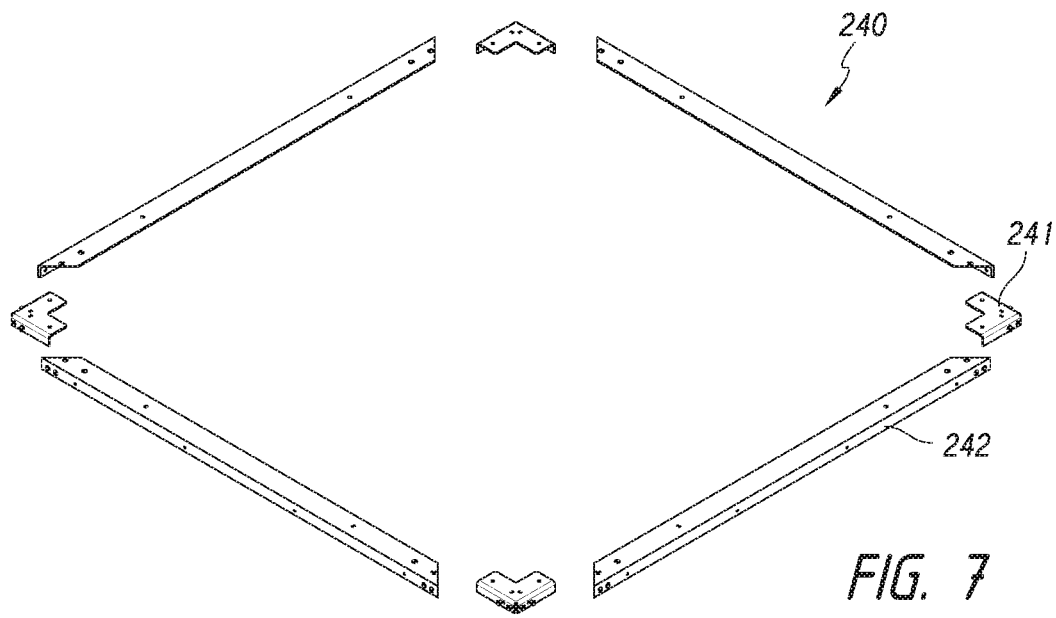
FIG. 7 is an exploded perspective of an example upper grow chamber frame.

FIG. 7 illustrates an example upper chamber frame 240. The upper chamber frame 240 may be constructed of a number of elongated frame side members 242, which may have an L-shaped cross-section, joined by a like number of frame joining members, in this case four corner members 241. The corner members 241 may be secured on the underside of the frame members 242, which may include mitered corners to provide for a smooth upper surface to facilitate easy installation of the upper frame and securing to the upper frame support plates 248 of the frame adapters 246 (FIGS. 4-6). Referring additionally to FIG. 2, in order to provide a smooth surface and substantially continuous surface on the upper frame of the chamber, upper frame spacer strips 243, which are of the same thickness as the upper frame support plates 248 may be provided to extend between adjacent upper support plates 248. Moreover, tapered, recessed fasteners, such as flathead or tapered screws may be used to secure the frame components. Thus, a very smooth and continuous upper surface may be provided on each chamber to facilitate effective sealing between chambers as well as smooth operation when a chamber is removed from the chamber stack as will be described.

Figure 8:
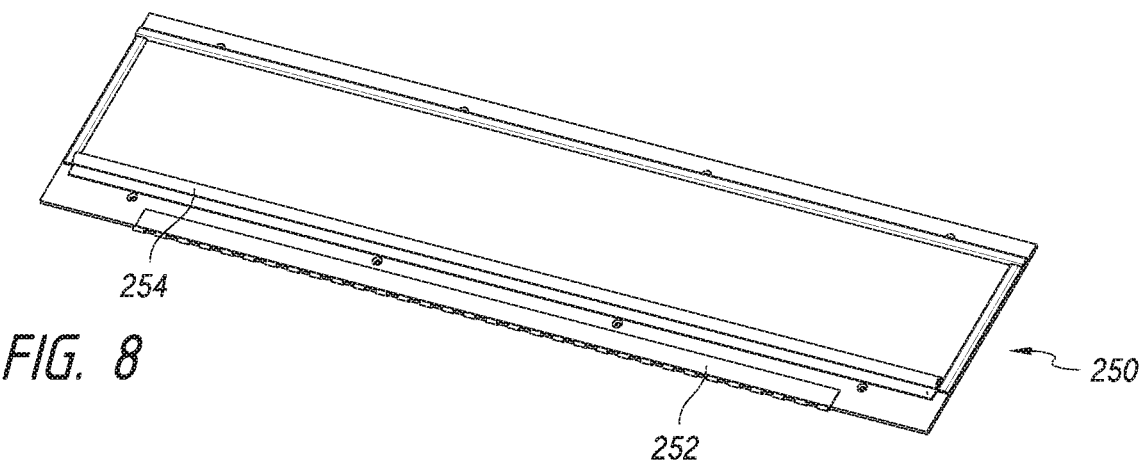
FIG. 8 is a perspective of an example grow chamber front panel.

FIG. 8 is an example construction for a front chamber panel 250. The panel may include a hinge 252 which enables the front panel to be pivotably mounted on the chamber frame 210 to enable access to the interior of the chamber. One or more sealing elements 254, such as a gasket and/or a raised portion, which may provide a friction fit, may be provided to ensure effective sealing between the front panel and the chamber frame 210. Such sealing elements may also be provided on the other panels, such as rear panel 260 and side panels 270 and 280.

Figure 9:
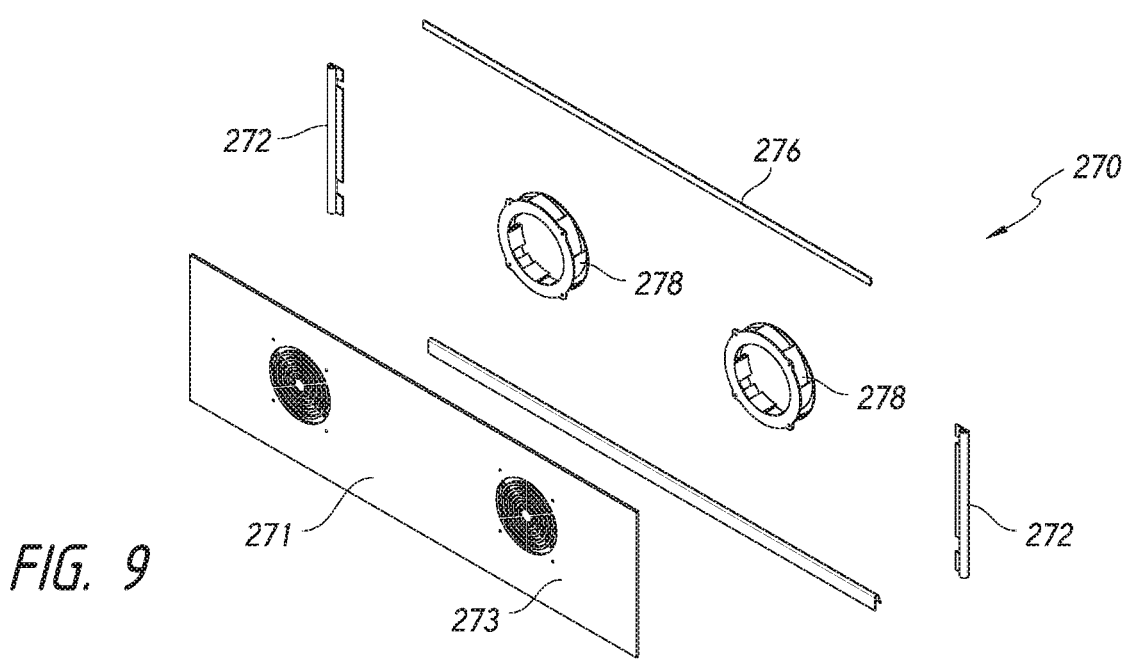
FIG. 9 is an exploded perspective of an example grow chamber intake side panel.

FIG. 9 is an exploded view of an example intake panel 270. The intake panel 270 may include a generally flat sheet member or main body 271 having one or more ventilation passages or ports 273 defined therein. A retaining ridge 274 may be fastened to an interior side of the intake panel 270 and may interface with and engage an upper edge of one a front lower frame member 231 (see FIGS. 2 and 4), which may allow the intake panel 270 to pivot slightly thereabout to permit the panel to rest in a slightly open orientation for access to the chamber interior. A sealing element 276 may also be fastened to an upper area of the interior surface of the panel 270 to provide a sealing engagement with the upper frame 240 (FIG. 4). Side members 272 may reinforce the strength of the panel and be provided with sealing edges or surfaces to engage or interface with surfaces on respective support columns 220.1 and 220.2 (FIG. 2). One or more vaned cowlings 278 may influence the flow of air or other fluid through the chamber intake panel and may direct incoming air to flow in a radially outward direction relative to the cowling, thus enhancing the distribution and flow of air within the chamber interior.

Figure 10:
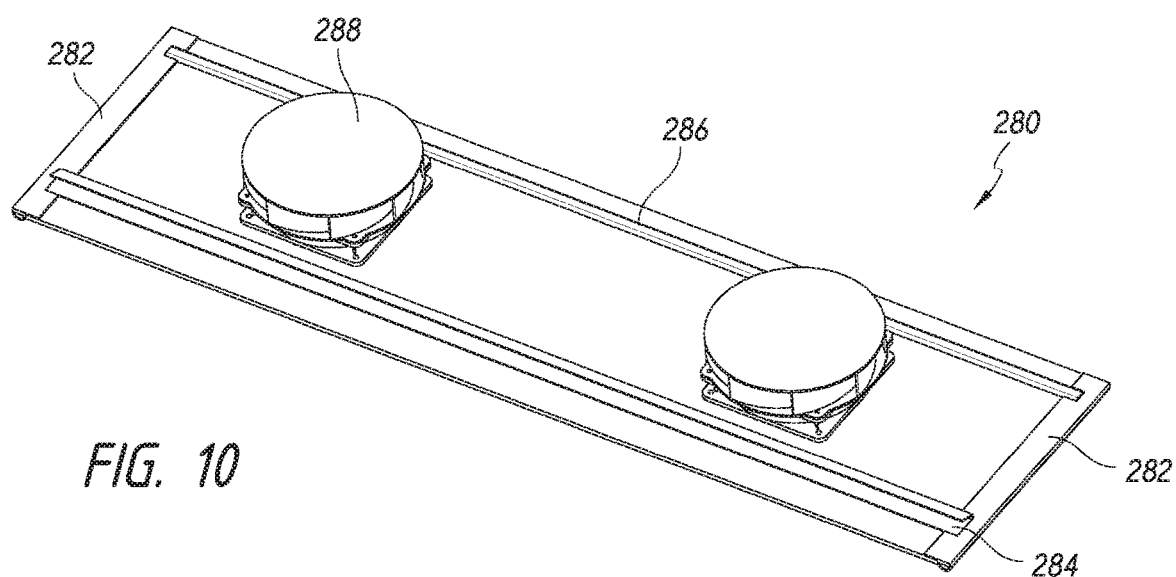
FIG. 10 is a perspective of an assembled exhaust side panel.
Figure 11:
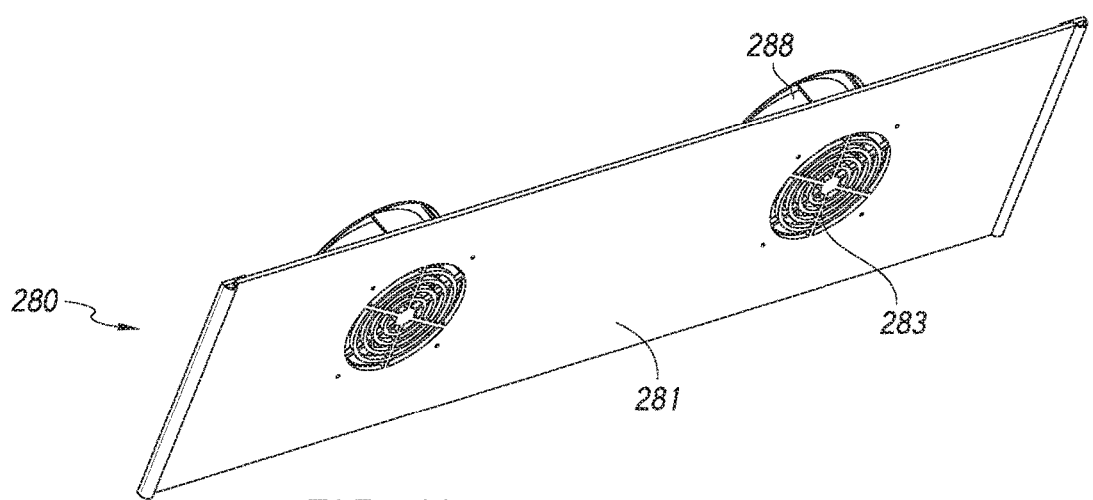
FIG. 11 is another perspective of the assembled exhaust side panel of FIG. 10.

FIGS. 10 and 11 are perspective views of a side exhaust panel 280. The side exhaust panel 280 may have a similar construction to the intake panel 270. A generally flat main body 281 may have a number of exhaust ports 283 formed therein, with respective exhaust fans 288 mounted there on to force air out of the chamber interior. A retaining ridge 284 may engage one of the chamber lower frame members and permit slight pivoting of the exhaust panel 280. Side members 282 provide strength and a sealing surface to engage or interface with surfaces on the respective support columns 220.3 and 220.4. A sealing element 286 may be provided on the interior surface of the exhaust panel 280.

Figure 12:
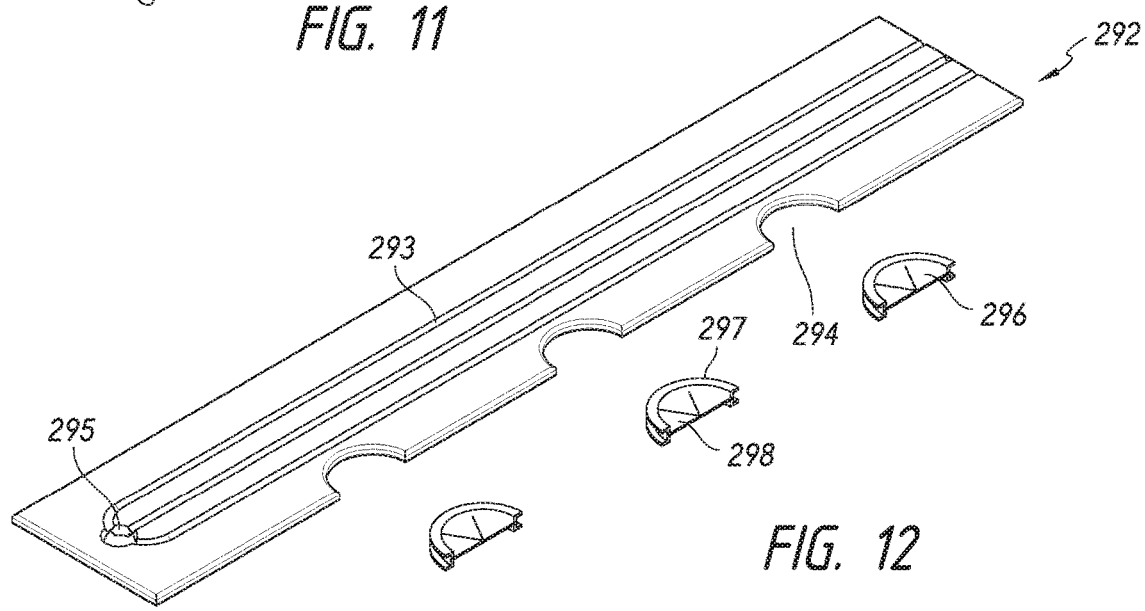
FIG. 12 is an exploded perspective of a modular floor/lid panel and plant interfaces.

FIG. 12 is a perspective view of a floor panel and plant interfaces for constructing the floor of the grow chamber. Floor panel may be of a generally geometric shape and formed by injection molding with a plastic material, such as a high strength thermoplastic, stainless steel that is cut into the desired geometric shape or other acceptable materials & fabrication methods. The floor panel 292 may include a number of semi-circular or other shaped recesses 294 which each may receive and retain therein a plant interface 296. Interfaces may be a full circle in shape (as in FIG. 2) with a single radial slit to permit sealing around the plant stalk while conforming to the floor design & functionality. Plant interfaces 296 may function to provide a seal around a plant stalk to prevent the passage of light into the chamber interior and/or to isolate the chamber interior and a plant section from other chambers and plant sections, such that the environment within the chamber and surrounding the specific plant section may be controlled separately and independently from other chamber interiors and respective sections of the same plant. Additionally, these plant interfaces act to help support the plants in the grow stack. Interface may be formed from an elastomeric material that includes an outer retaining channel 297 for frictionally engaging a respective recess 294. One or more slits 298 may be formed within the interface 296 to permit the interface to engage and/or otherwise interface with the plant stalk. Alternatively, or in combination, the interface may include bristles or other features to provide a substantial sealing engagement with the plant stalk. A number of flow channels 293 may be formed in an upper surface of the floor panel 292 and may communicate with one or more passages 295 which permit the flow of liquid within the chamber through the chamber floor to a chamber below or to a base which collects and recirculates liquids in the system. In the illustrated implementation, each pair of floor panels 292 define three grow passages extending through the chamber floor. Thus, the six floor panels define nine grow passages, each of which may accommodate a single plant, with each chamber in a chamber stack controlling a respective growth environment for one section of each of the nine plants growing in the chamber stack. Similarly, such panels may be used to form a lid or ceiling on one or more chambers. As will be recognized by those of ordinary skill, the present disclosure provides for a widely adaptable floor and lid configuration where any number of plant interfaces, in any size, shape and pattern, may be provided to support different crop types.

In accordance with an aspect of the disclosure, the floor panels may be of a standardized and customizable, modular construction. That is, the floor panels 292 may be of identical shape and may fully occupy a floor space defined in the lower chamber frame 230. Referring back to FIG. 2, owing to the position of the support columns 220, the lower chamber frame 230 defines a floor space, bounded by the upright walls of the lower chamber members, which may have an L-shaped cross-section. The floor space is such that it may be completely occupied by floor panels of a standardized shape, such as a rectangular shape. Similarly, the upper chamber frame 240 may define a ceiling or lid space for supporting ceiling or lid panels (not shown) on one or more of the chambers. The ceiling panels may be of a standardized shape as are the floor panels 292 and may be identical in shape (i.e., interchangeable with) the floor panels such that only a single shape panel needs to be manufactured to permit users to configure chambers with floors and ceilings or lids as needed in a given stacked chamber system. For example, a lid may be constructed on an upper most chamber in a stack to shield the chamber interior from light. The orientation of the support columns 220 is outside of the square floor (and ceiling) space. Thus, the floor and ceiling or lid panels need not be formed with cutouts or discontinuities in order to fit within the floor space. Not only does this eliminate the need for non-standard shaped floor panels, but it provides for ease of installation, cleaning and maintenance of the chamber interior.

As will be recognized, according to aspects of the disclosure, the grow chamber construction permits a grow chamber to be constructed around one or more growing plant stalks without disturbing the growth of the plant(s). Specifically, the chamber construction permits an operator to first construct the upper and lower frame assemblies 240 and 230, and then secure them to the upper and lower portions of the support columns 220 using the upper and lower frame adapters. The frame assembly can be placed on top of a first chamber within which the one or more plants are growing and the alignment projections (229, FIGS. 5 and 6) of the first chamber. The floor panels 292 may then be set in place within the lower frame floor space with the recesses 294 and plant interfaces 296 being placed around respective plant stalks. The front, back and side panels, with intake and exhaust features that provide for venting and/or circulation, may then be installed on the chamber frame and a lid, or additional chamber, may be installed on top of the (second) chamber to form an enclosed and controlled environment in the second chamber for respective sections of the plant(s). As will be recognized, the construction of each chamber in a chamber stack may thus be done to create additional controlled growth sections of existing plants and without disturbing, removing or harming the plant(s). This, in turn, enables the addition of grow chambers to the stack with virtually no disturbance to the plants and while the plants continue to grow.

Figure 13:
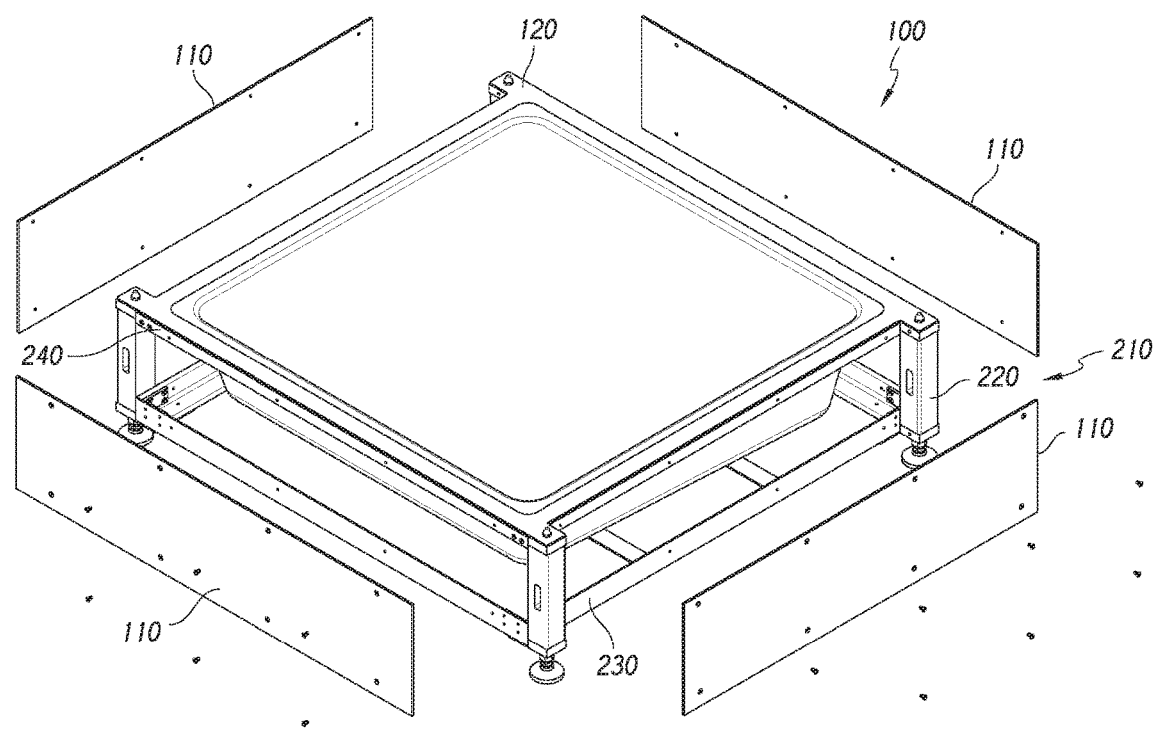
FIG. 13 is an exploded perspective of a base used in the system of FIG. 1.

FIG. 13 is an exploded view of an example base according to an aspect of the disclosure. As will be recognized, owing to one of the advantages of the present disclosure, the modular components utilized in construction of the upper chambers 200 (FIG. 1) including the chamber frame 210 and support columns 220 may also be utilized to construct a base 100. Instead of floor panels, a basin or tray 120 may be supported within the chamber frame 210 on the upper frame 240. Support columns 220 may be provided with adjustable pedestals 150 which support the base 100, and thus, ultimately, the entire stack of chambers, on a floor surface. A number of side panels 110 may be provided for aesthetic purposes.

FIGS. 14.1 and 14.2 illustrate an example growing process that may be facilitated by the above-described chamber constructions. Configurations of the system 10 (FIG. 1) corresponding to particular process steps are shown to the left of the example steps. At step 1402, the base ("Base") and first chamber ("C1") are constructed in place on a surface. Plant growth is initiated, for example, by the placement of a potato start, which may constitute a first section of the plant at a first maturity level in the first chamber. As will be recognized, while a single plant is being referenced for purposes of simplicity in this example, the chambers may support multiple plants (i.e., such as the nine plant interfaces described in the examples with regard to FIGS. 1-13). At step 1406, when the first section of the plant reaches a second maturity level, which may coincide with the potato start forming a stalk or canopy, which may constitute a second plant section, a second chamber ("C2") may be constructed around a second section of the plant. As described above, such construction of the second chamber may occur without disruption to the growth of the plant growing in the first chamber. The second plant section may be modified prior to construction of the second chamber, such as by removal of some or all of the leaves growing on the plant stalk in order to modify the second section from a stalk/canopy portion to a root mass/productive portion. The second chamber in this case may include a lid to shield the productive plant section from light and to enclose the plant section.

At step 1408, when the plant reaches a third maturity level, a third chamber may be constructed around a third section of the plant. This may include a modification of a stalk portion of the plant as was done for the second chamber above. Similarly, at step 1410, when the plant reaches a fourth maturity level, a fourth chamber may be constructed around a fourth plant section. As will be recognized, in this manner, sections of the plant may be modified with the addition of respective chambers, with each productive plant section having a different maturity level of the crop/produce, with the most mature productive section of the plant being in the first chamber.

In accordance with aspects of the disclosure, the grow chamber constructions disclosed herein not only eliminate the need for an external frame, and associated complexities, to support the chamber stack, but also support efficient and simple removal of chambers as part of a harvesting process. Referring particularly to FIG. 14.2, at step 1420 during a harvesting step, the chambers above the first chamber, that is, the second, third and fourth chambers, are supported via the support interfaces on the support columns on the second chamber. This may be done with a stationary support, schematically represented to the left of step 1420, or with a shifting device, as will be described herein. Removal of the first chamber may then occur by either or both of steps 1422 and 1424, both represented by dotted lines in the process to indicate they are optional and may be performed together or alternatively. At step 1422, the portion of the stack constituted by the second, third and fourth chambers (C2, C3 and C4) may be elevated with an external lift, as indicated by the arrows. In addition, or alternatively, at step 1424, the first chamber may simply be shifted a sufficient distance to disengage the alignment projections/connecting pins (229 in FIGS. 5 and 6) to permit removal of the first chamber, with or without the base. Lowering of the first chamber and base may occur by virtue of collapsible/extendable mounting features on the base, which permit the base and first chamber to lower a slight distance relative to the supported second, third and fourth chambers, so that the alignment projections clear the recesses of the support columns of the second chamber. At step 1426, the first plant section may be severed from the rest of the plant using a cutting device. At step 1428, the first chamber may be removed and the crop harvested from that chamber's stacked production layer of the plant housed within the first chamber. After harvesting, the remaining chambers C2, C3 and C4 may be lowered onto the base, and another chamber added to the top of the stack to initiate modification of yet another section of the plant from a stalk into a productive section (root mass). As will be recognized, the process provides continued harvesting of crop from successive sections of a single plant. In addition, multiple productive levels of the plant may be developed under a single plant canopy and thus drawing from the same energy source. In this manner, productivity of the plant for a given energy input may be increased.

Figure 15:
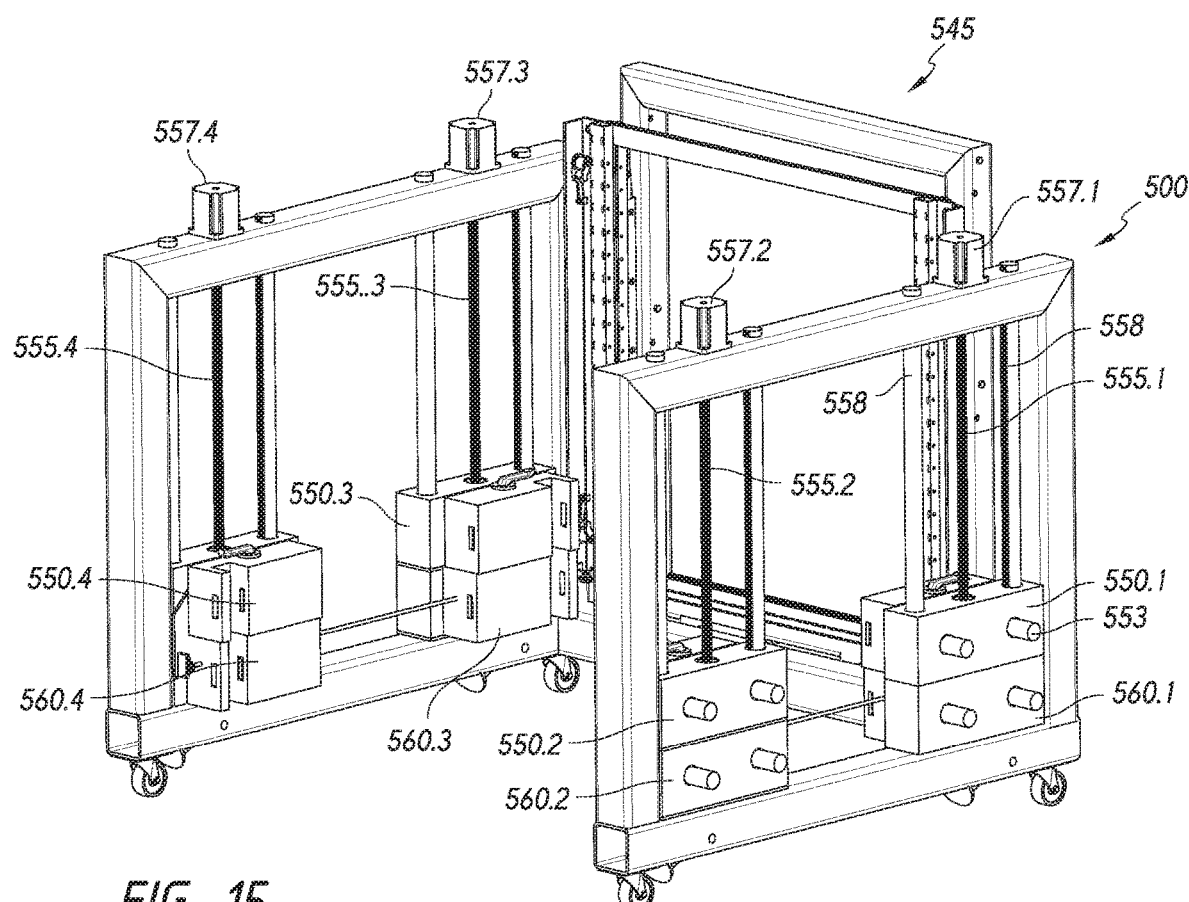
FIG. 15 is a perspective of a portable shifting device suitable for use with the system of FIG. 1 and for implementing the growing process of FIGS. 14.1 and 14.2.
Figure 16:
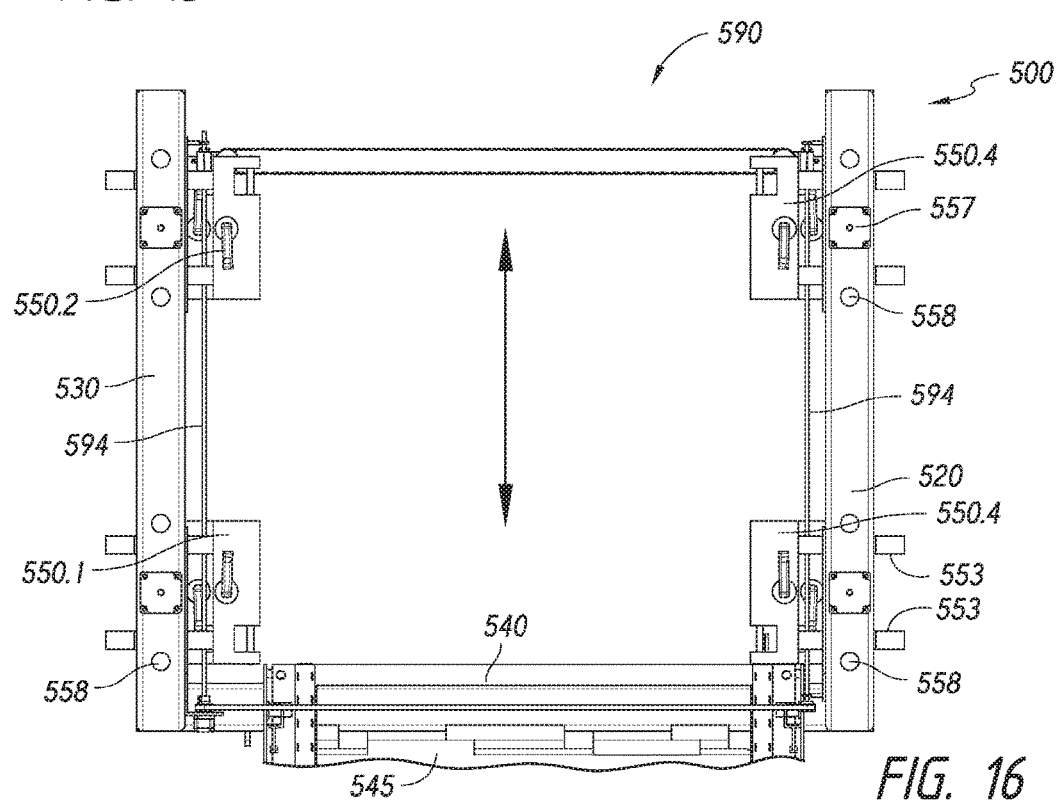
FIG. 16 is a top view of the shifting device of FIG. 15.

According to an aspect of the disclosure, chamber shifting devices which facilitate performance of one or more of the steps described above may be provided. FIGS. 15-31 illustrate a portable shifting device 500 that may be utilized with a number of grow chamber stacks that may be located in a large scale grow operation. Referring to FIGS. 15 and 16, shifting device 500 may have a generally U-shaped configuration when viewed from the top, with a pair of opposed side frames 520 and 530 connected by a rear cross-member 540 and a rear chamber removal carriage 545 pivotably connected to the cross-member 540. Each side member 520, 530 includes two pairs of shifting carriages 550 for releasably engaging respective shifting interfaces (228 in FIGS. 5 and 6) on the support columns 220 (FIG. 2) on respective chambers in the chamber stack. Shifting carriages 550.1, 550.2, 550.3 and 550.4 engage respective shifting interfaces on a second chamber (not shown in FIG. 15) and shifting carriages 560.1, 560.2, 560.3 and 560.4 engage respective shifting interfaces on a first chamber in the chamber stack (not shown in FIG. 15). A pair of lead screws 555.1, 555.2, 555.3 and 555.4, on each side member, each actuated by a servo motor 557, provide for actuation of the shifting carriages 560. Moreover, as will be explained, each shifting carriage 550 may be provided with a locking mechanism and driving mechanism to permit independent movement and locking of the two shifting carriages on each lead screw relative to one another. A pair of guide rods 558 extend on each side of each lead screw 557 and are fixed to the side members and extend through a journal in each shifting carriage to provide for lateral support and guidance thereof. A cutting mechanism 590 (FIG. 16) is mounted for reciprocating movement on cutting mechanism in a direction parallel to the ground to travel in a space between grow chambers, from the front of the chambers to the back, to sever plant sections, as will be explained.

Figure 17:
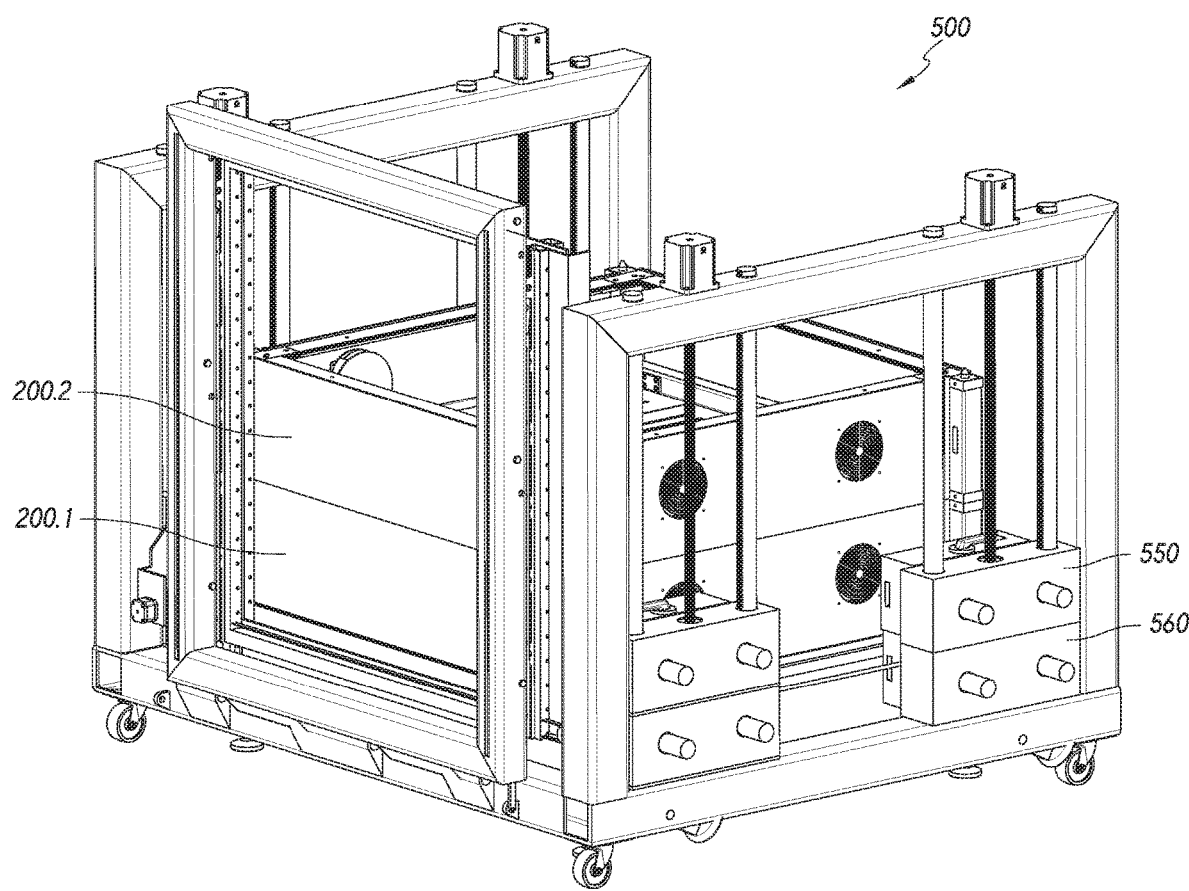
FIG. 17 is a perspective of the chamber shifting device of FIG. 15 situated around a grow chamber stack having first and second grow chambers.

FIG. 17 illustrates a shifting device 500 disposed in position around a grow chamber stack having a first grow chamber 200.1 and second grow chamber 200.2. The shifting device may be transported into position on caster or wheel elements disposed beneath the side frames and or cross member. In FIG. 17, the shifting carriages 550 and 560 are not yet deployed into engagement with the shifting interfaces on the chambers.

Figure 18:
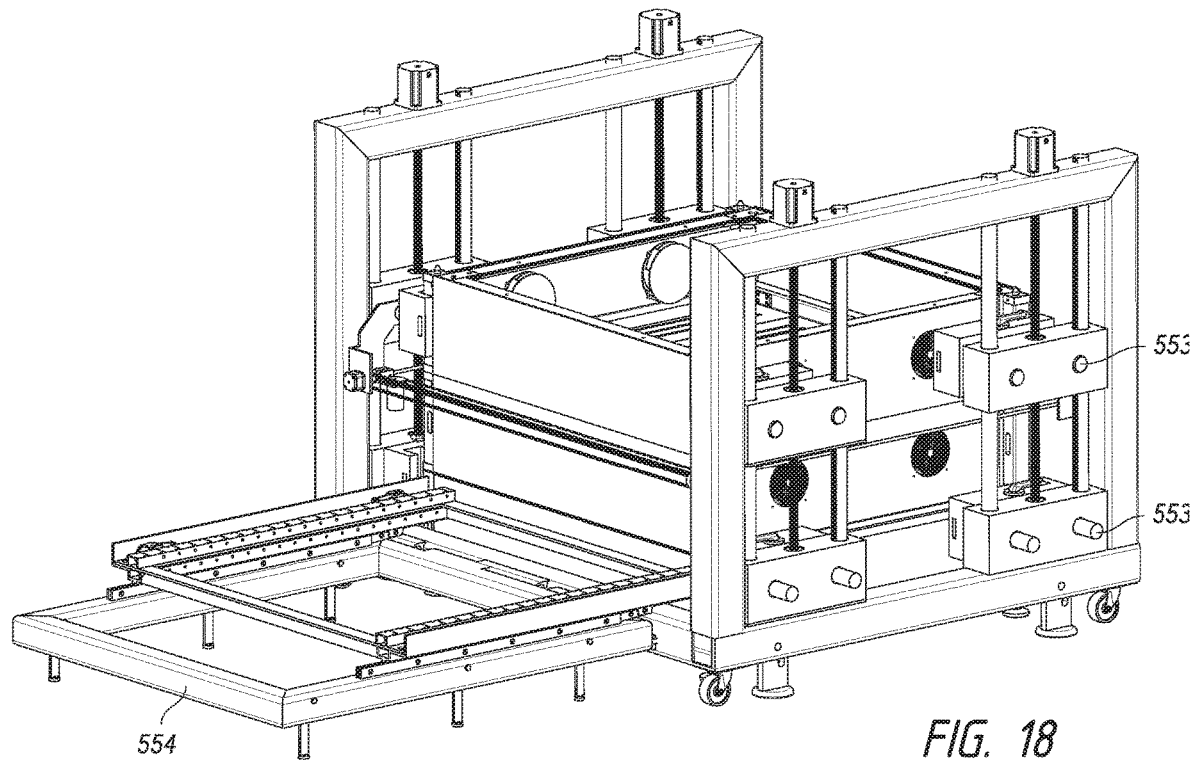
FIG. 18 is a perspective showing the shifting device of FIG. 15 with shifting carriages engaging the shifting interfaces of a second chamber in the stack.
Figure 19:
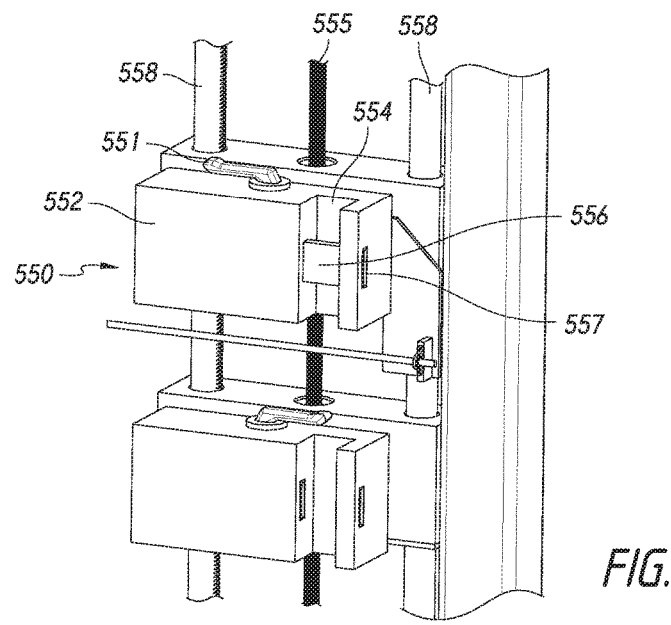
FIG. 19 is a perspective showing details of shifting carriages of the shifting device of FIG. 15.

FIG. 18 shows the shifting device 500 in position around a pair of grow chambers with the chamber receiving carriage 545 deployed to a horizontal position. Pivoting may occur by manual operation, or by appropriate automated controls and motors. FIG. 18 also shows the upper shifting carriages 550 in a chamber-engaging position with the guide rods 553 extended inward towards the second chamber. Referring additionally to FIG. 19, each shifting carriage 550, 560 includes a gripping block 552 having a recess 554 defined therein and shaped to receive the width of a supporting column on the chamber. A locking bar 556 may be actuated by a handle 551 through an appropriate linkage, as will be explained and may extend through the shifting interface in a respective support column (not shown in FIG. 19) and into a receiving slot 557 in the gripping block 552. In this manner, a respective support column (228, FIGS. 5 and 6) may be securely locked in place on each shifting carriage prior to shifting the chamber. Each shifting carriage 550, 560 includes a pair of guide rods 553 which provide vertical support to the gripping block 552 and allow it to move horizontally relative to a shifting carriage base 561 (FIG. 19), which selectively engages a respective lead screw. Horizontal movement of the gripping block 552 relative to the shifting carriage base 561 may be done manually or may be done with controlled motorized components that act upon the guide rods 553 and/or the gripping block 552.

Figure 20:
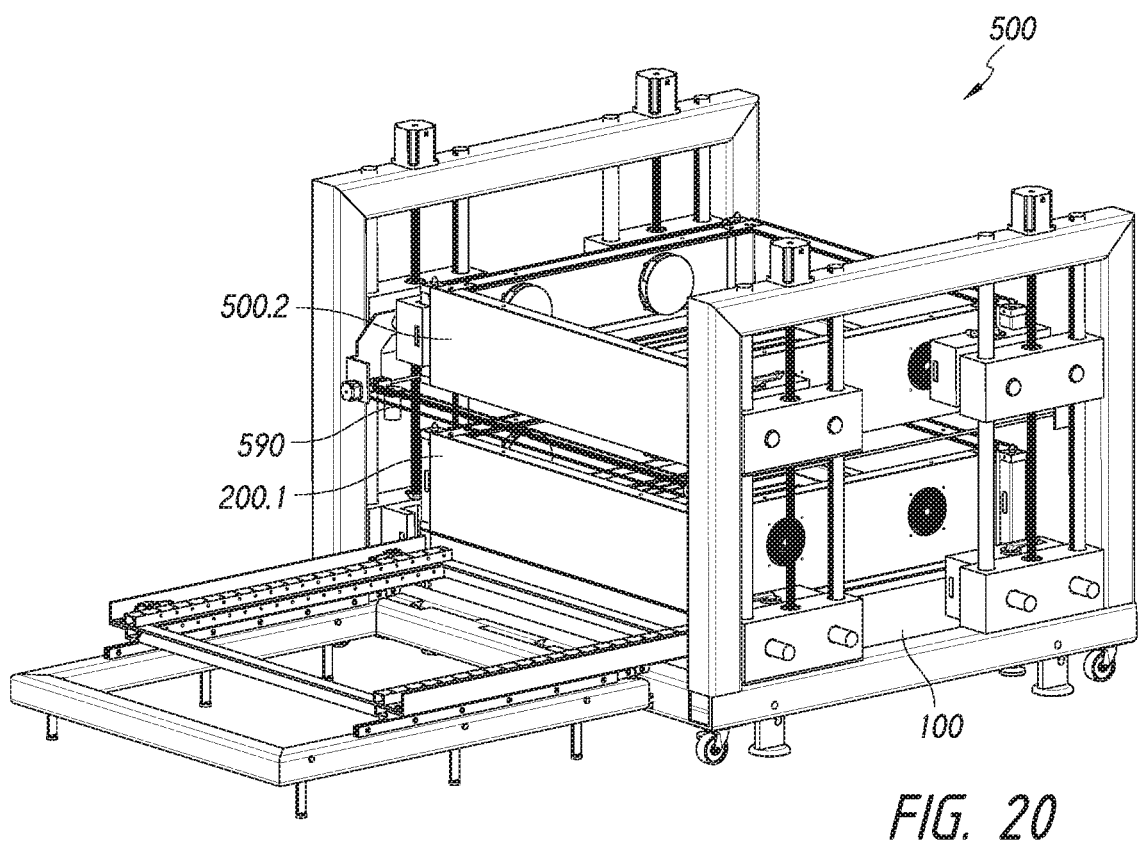
FIG. 20 is a perspective showing the shifting device of FIG. 15 with shifting carriages on the second chamber.

FIG. 20 shows the shifting device 500 with the shifting carriages 550 in a position in which the second chamber 200.2 is lifted from the first chamber 200.1. As will be recognized, there may be additional chambers (i.e., third chamber, fourth chamber) above the second chamber and those chambers would also be lifted into an elevated position above the first chamber. In this position, the cutting mechanism 590 may travel through the space between the first chamber and the second chamber to sever the plant section(s) in the first chamber from those in the second chamber. Operation of the cutting mechanism 590 will be explained below.

Figure 21:
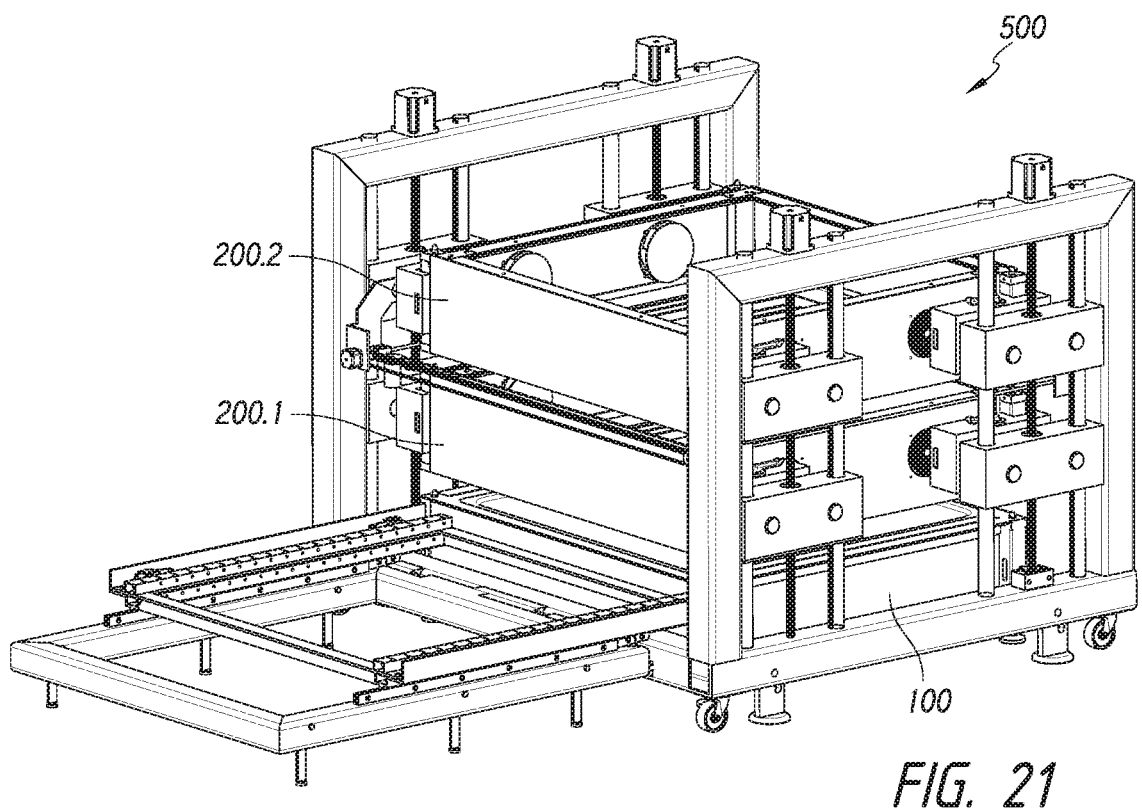
FIG. 21 is a perspective showing the shifting device of FIG. 15 engaging a first chamber in the stack while supporting the second chamber.
Figure 22:
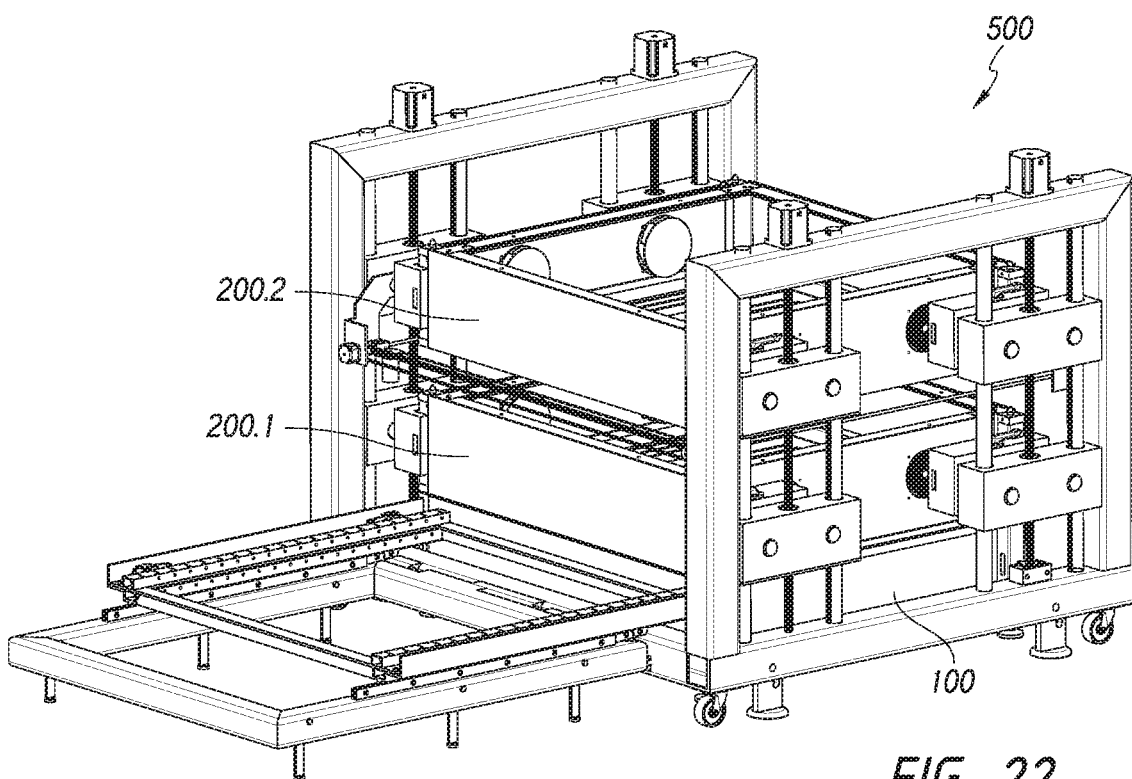
FIG. 22 is a perspective showing the shifting device shifting the first chamber in the stack.
Figure 23:
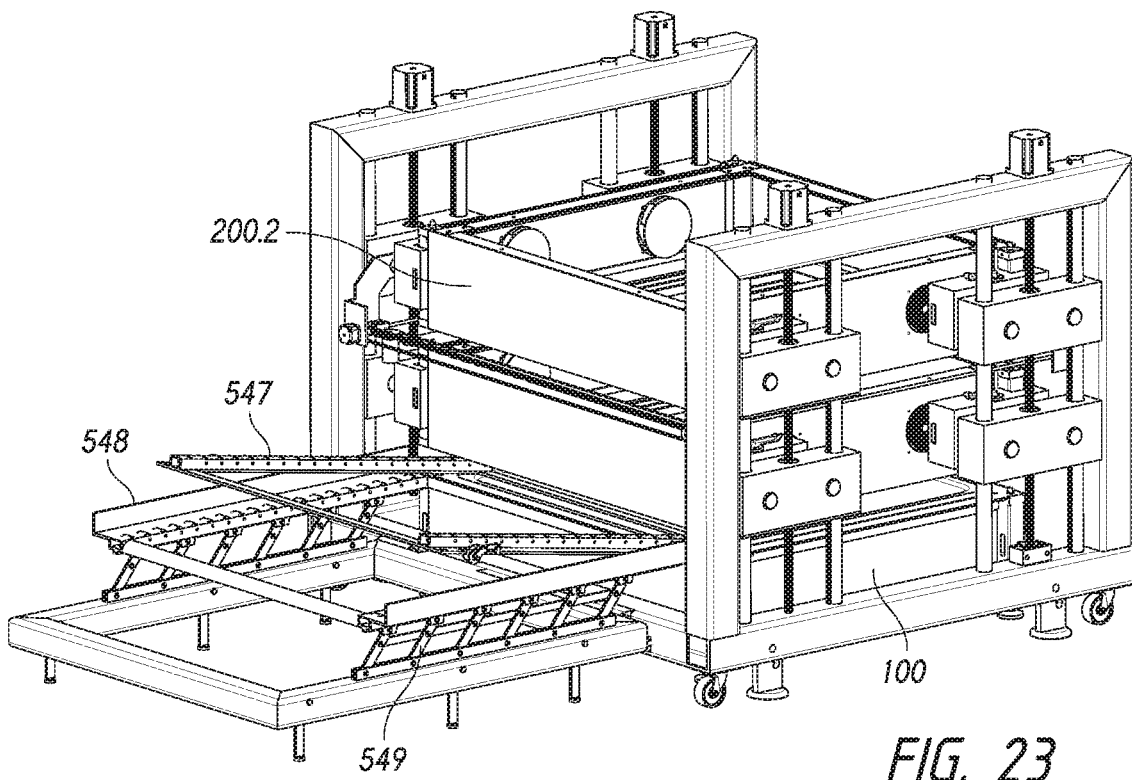
FIG. 23 is a perspective showing the shifting device shifting the first chamber in the stack and deployment of a roller sled for supporting the bottom of the first chamber.
Figure 24:
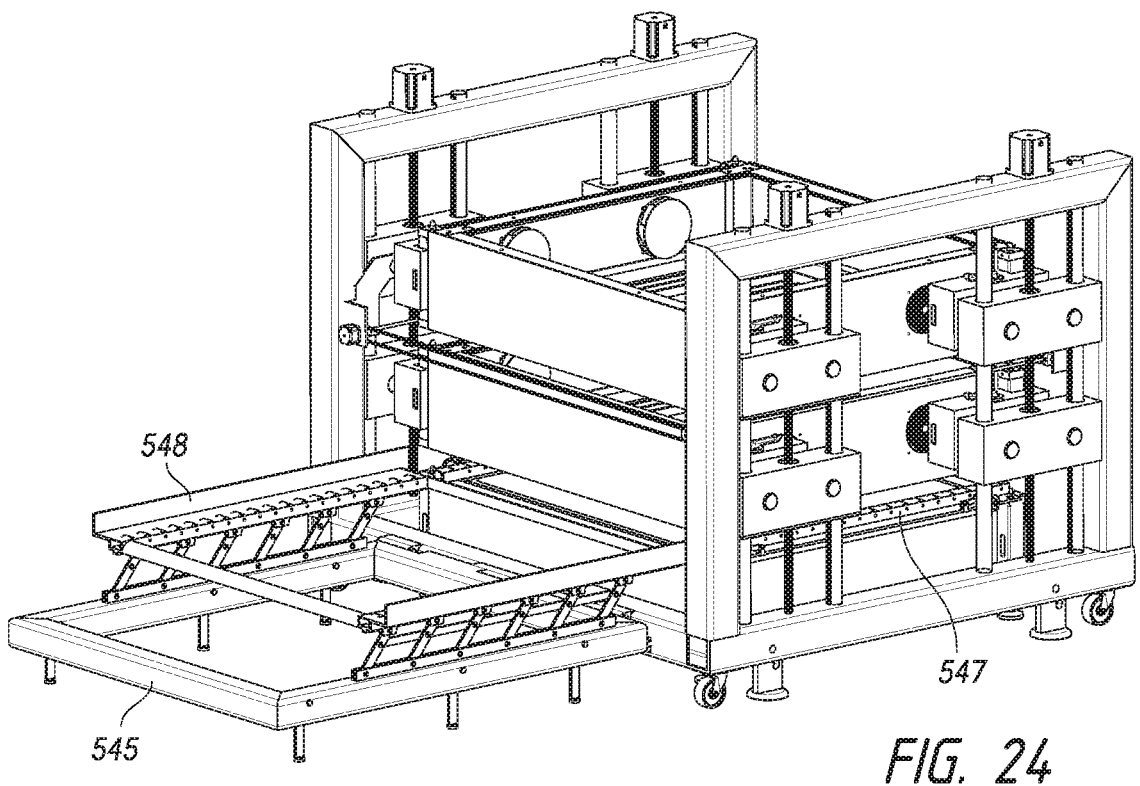
FIG. 24 is a perspective showing the shifting device shifting the first chamber to permit the roller sled to be placed beneath the bottom of the first chamber.
Figure 25:
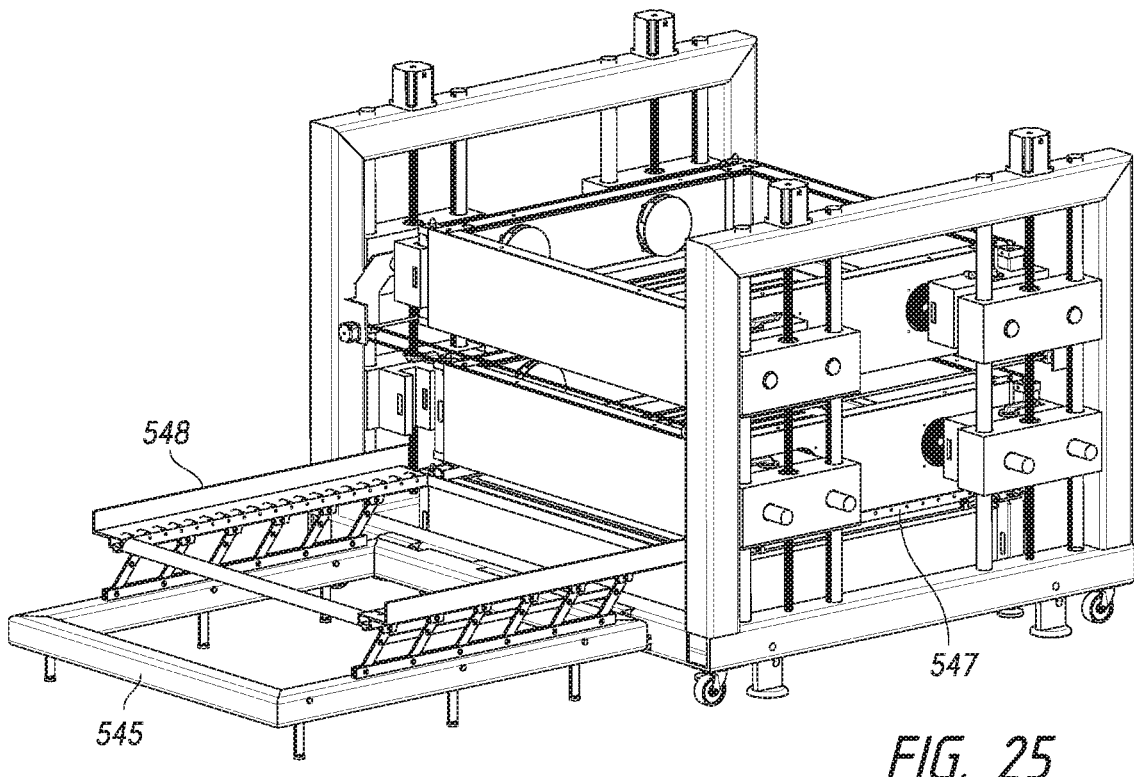
FIG. 25 is a perspective showing the shifting device lowering the first chamber onto the roller sled.
Figure 26:
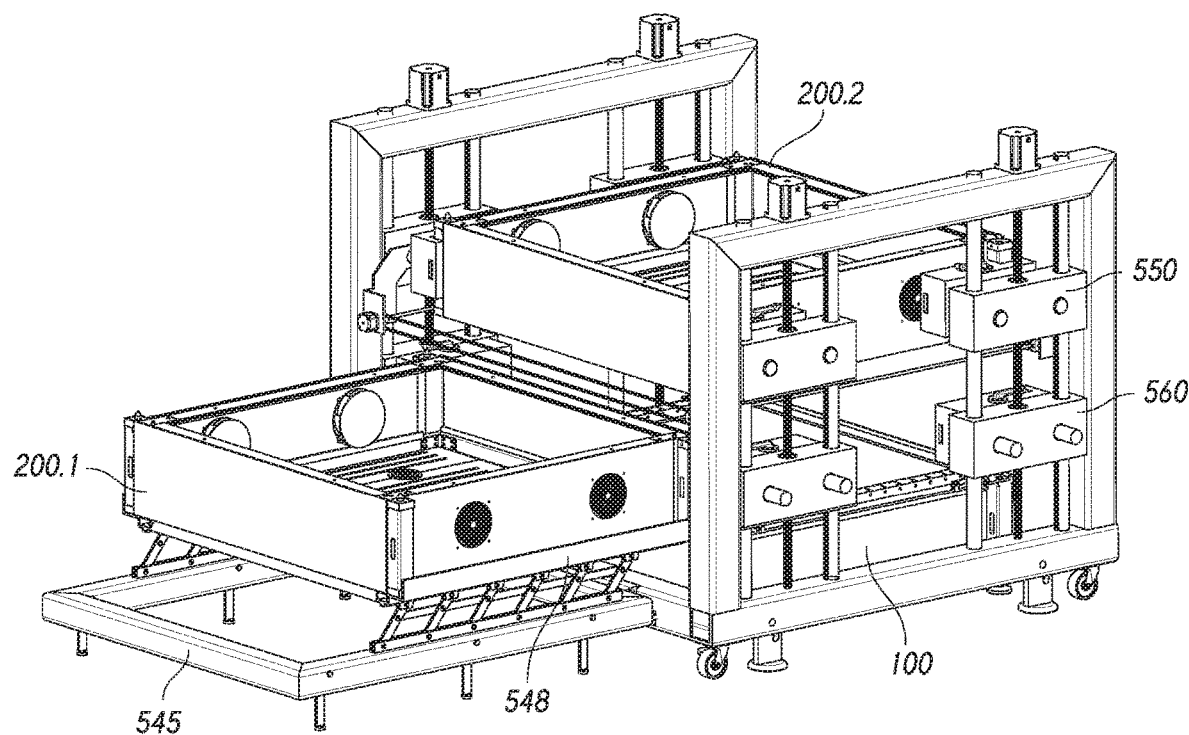
FIG. 26 is a perspective showing the shifting device with the first chamber being rolled onto a chamber receiving carriage on the shifting device.
Figure 27:
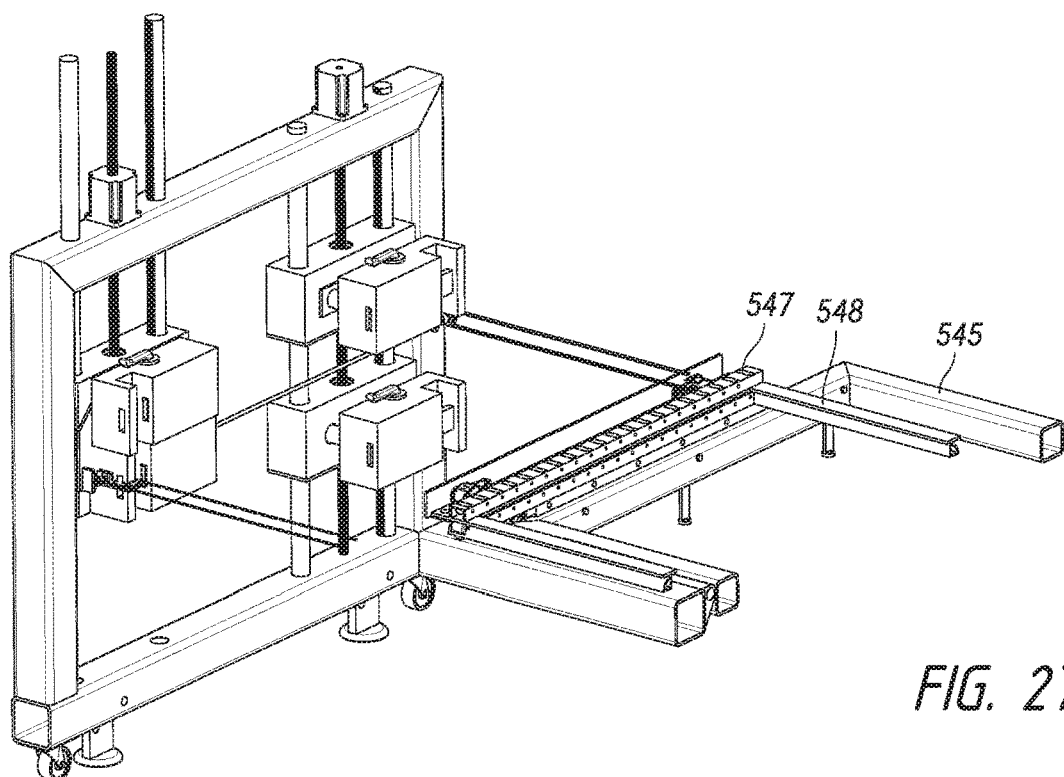
FIG. 27 is a cutaway perspective showing details of a shifting carriage, a chamber rolling sled and chamber receiving carriage of the shifting device of FIG. 15
Figure 28:
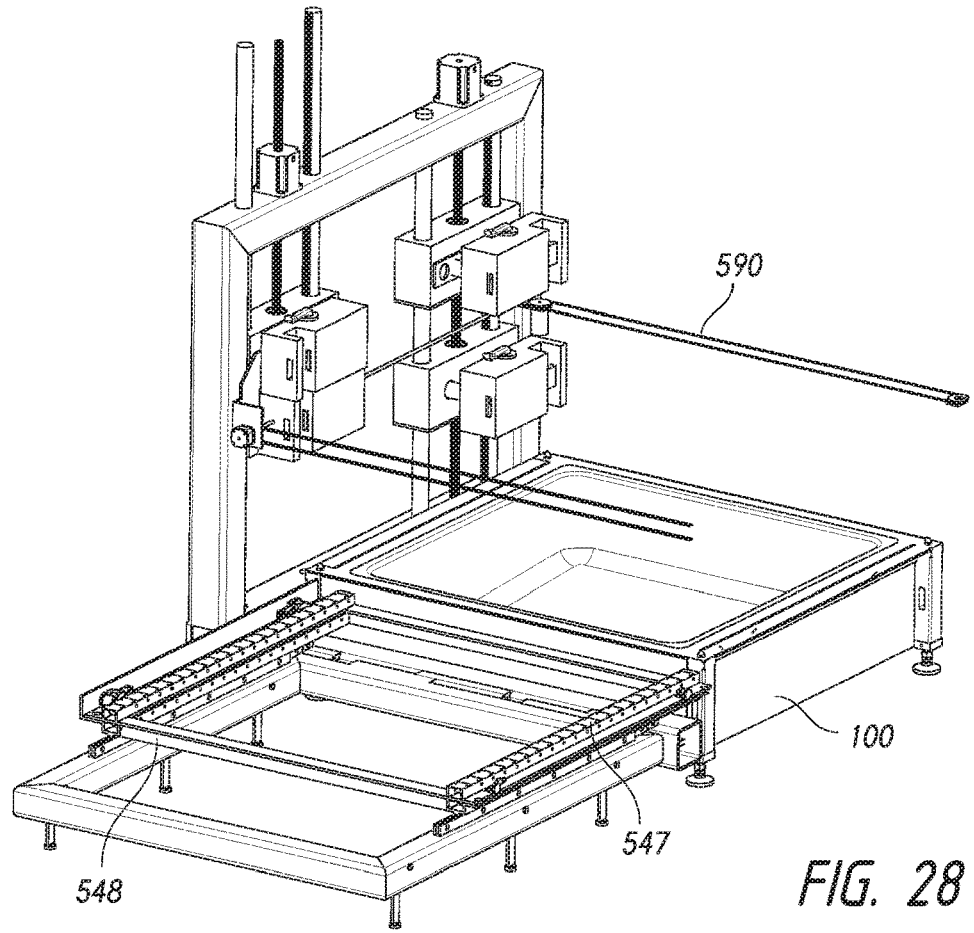
FIG. 28 is a cutaway perspective showing details of a chamber rolling sled and receiving carriage of the shifting device of FIG. 15 showing interaction with a base.

FIG. 21 shows the shifting device 500 with shifting carriages 560 in a position in which they engage the first chamber in preparation for shifting the first chamber to permit removal thereof. FIG. 22 shows the first chamber being lifted by the shifting carriages 560 to create a space between the first chamber and the base 100. Referring additionally to FIG. 23, removal of the first chamber may be facilitated by a roller sled 547 deployed from the chamber removal carriage 545. A chamber receiving frame 548 may be supported with a number of linkages 549 on the chamber removal carriage 545. The chamber receiving frame 548 may be pivoted to an elevated position shown in FIG. 23, in which it is elevated to the same height as the top of the base 100. Roller sled 547 may then be manually rolled from the chamber receiving frame 548 onto the upper frame of the base. FIG. 24 shows the roller sled 547 in position beneath the first chamber and supported on the upper frame of the base 100. Further details are shown in FIG. 28, in which a portion of the shifting device 500 and the first and second chambers have been omitted to show the position of roller sled 547 on the base 100. After the roller sled has been put in position beneath the first chamber, the lower shifting carriages are actuated to lower the first chamber 200.1 onto the roller sled 547. The handles on the shifting carriages are actuated to disengage the locking bar from the shifting interfaces of the support columns, and the shifting carriages are retracted from engagement with the first chamber support columns, as shown in FIG. 25. The first chamber 200.1 may then be rolled onto the chamber receiving frame 548 using the roller sled 547 to the position shown in FIG. 26. The first chamber may be subsequently lifted from the chamber receiving frame 548 and removed for further processing/harvesting steps for the plant section (crop) contained therein.

Figure 29:
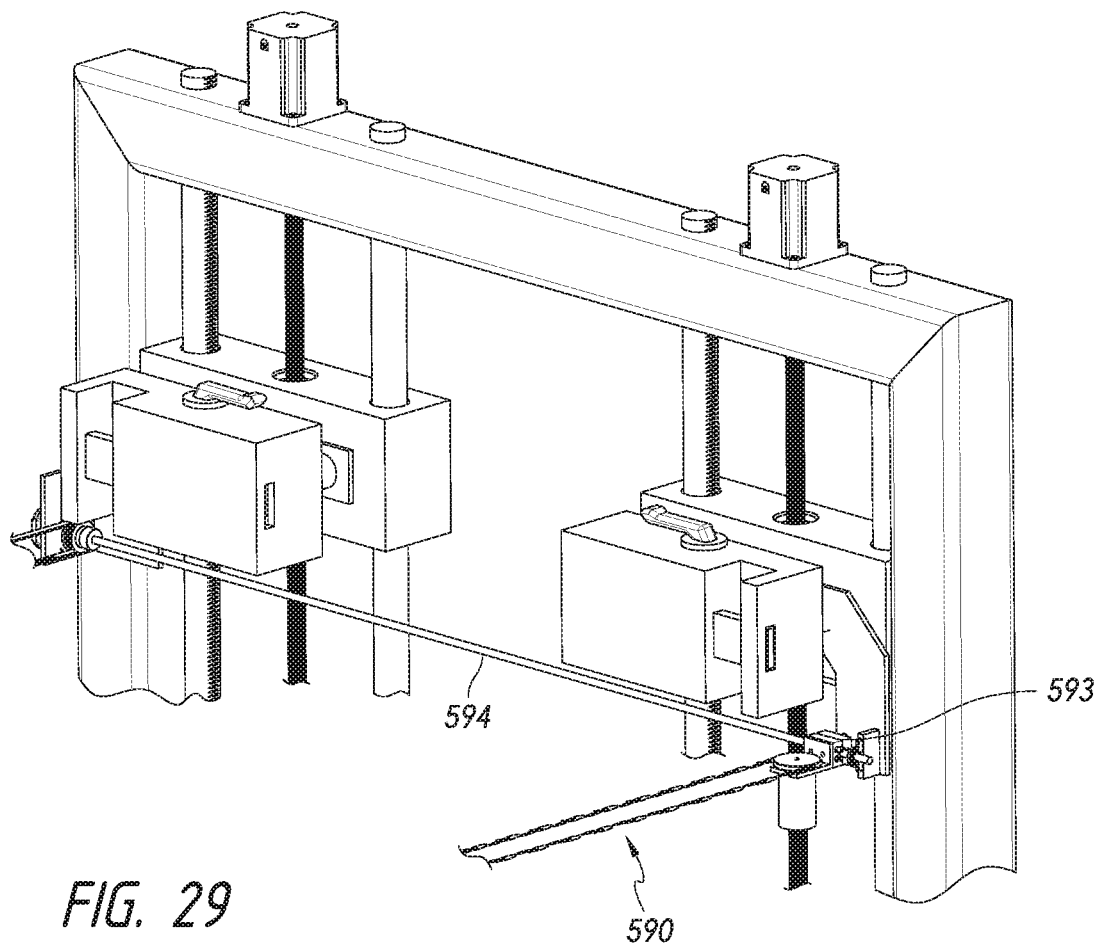
FIG. 29 is a perspective showing details of a plant section cutting mechanism of the shifting device of FIG. 15.

FIG. 29 illustrates details of a cutting mechanism 590, which may include a cutting band or wire 591 which extends around a rotating drive motor 592. At an opposite end is a pulley or other element (not shown) to keep the band or wire 591 in tension. Band or wire 591 may travel in a single direction, or it may reciprocate to effectuate severing of the plant section in a chamber below the cutting mechanism 591. Motor 592 and the opposite end pulley may each be mounted on a cutting mechanism carriage 593 which may be slidably secured to a guide rod 594 extending from the front to the back of the shifting mechanism frame on each side thereof. The cutting mechanism carriages 593 may be moved from the front to the back of the shifting mechanism frame with motorized components or with a manually operated linkage that allows an operator to move the assembly along the guide rods 594 and in the space between chambers when severing of a plant section is desired.

Figure 30:
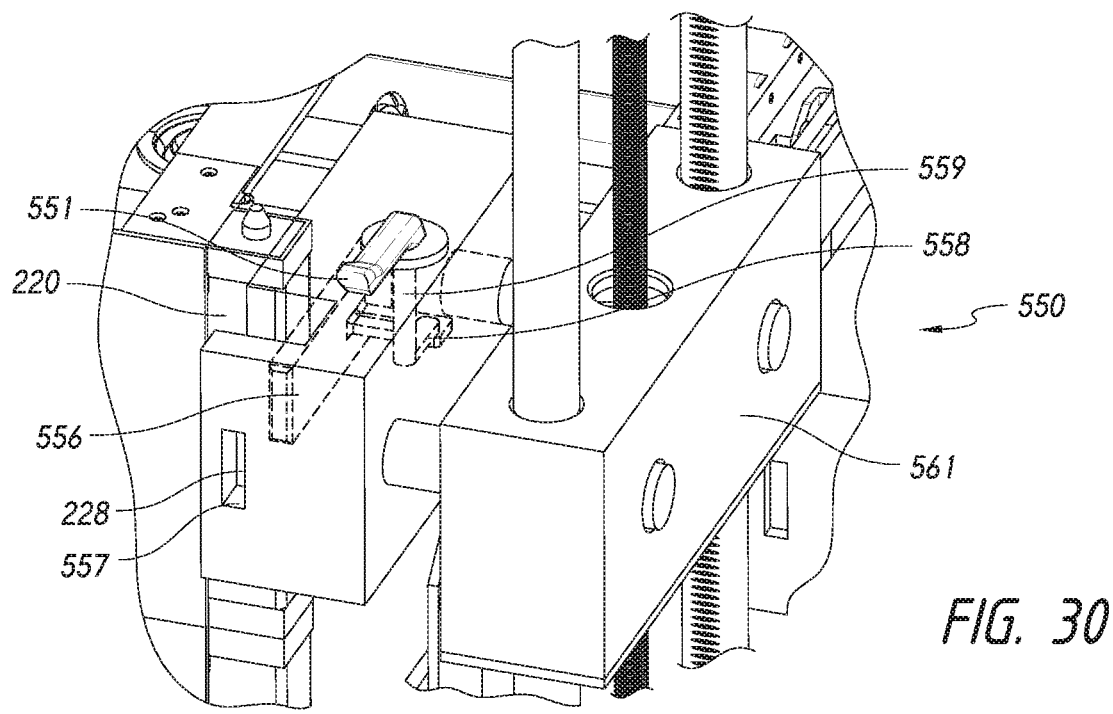
FIG. 30 is a perspective showing details of a shifting device locking bar interacting with a lift interface on a chamber.

FIG. 30 illustrates details of a linkage between the shifting carriage handle 551 and the locking bar 556. The linkage may include a camming extension 558 extending from the shaft of the handle and being pivotably connected to a yoke 559 extending from the locking bar 556. Rotation of the handle 551 causes movement of the extension 558 and corresponding sliding movement of the locking bar 556 within the shifting carriage gripping block 552.

Figure 31:
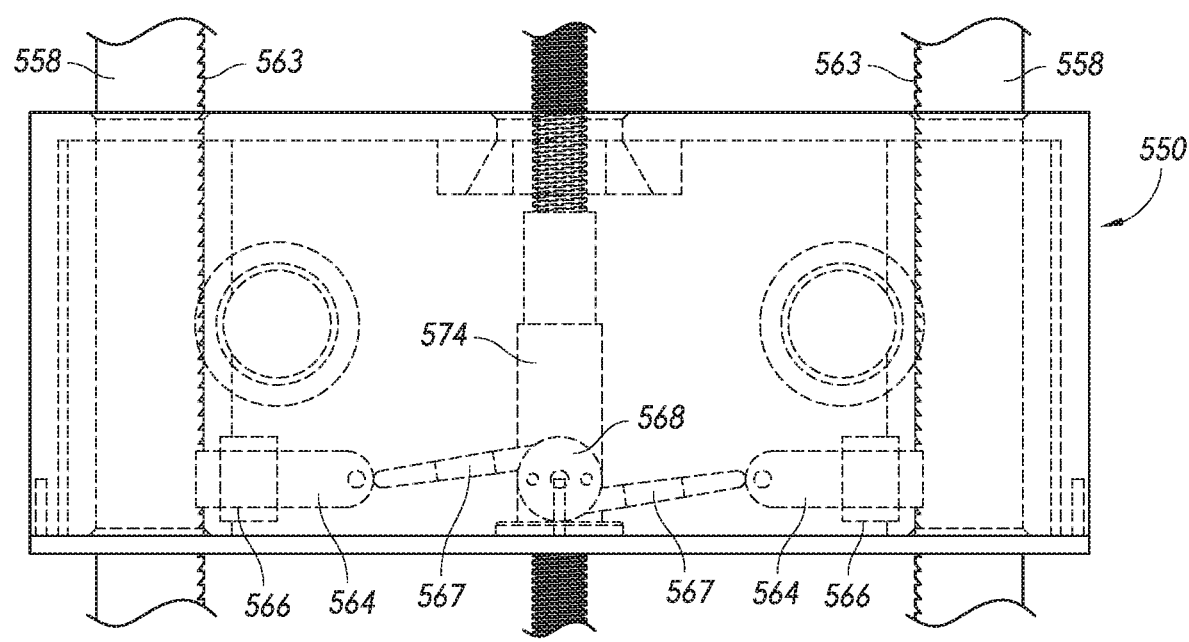
FIG. 31 is a side cutaway view showing details of a shifting carriage drive mechanism and locking mechanism.

FIG. 31 is a cross section of a shifting carriage 550 showing internal components for driving and locking the shifting carriage. With regard to the locking mechanism, the guide rods 558 may be provided with friction-enhancing features, such as locking teeth 563 formed in or extending along a side of the guide rod 558. A pair of locking grips 564 have mating teeth 565 formed thereon for engaging the locking teeth 563 of the guide rods and may be mounted for reciprocal movement within journal or housing elements 566. Linkages 567 connect the locking grips 564 to a crank 568 which may be moved by a motor (not shown) controlled by a control system. These components provide for selective locking an unlocking of the shifting carriage to the guide rods 558. With regard to the locking mechanism, a conical half-nut assembly 570, with two tapered or conical elements that may be biased outward by a spring may be selectively moved upward in FIG. 31 into locking engagement with a conical surface on a locking block 572 secured to the shifting carriage housing. Upward or downward movement of the shifting carriage may be facilitated by an outer actuating tube 574 that surrounds the lead screw and may be moved upward by a camming surface on the crank 568 such that rotation of the crank results in upward movement of the actuating tube 547 (as well as actuation of the locking grips 564. Due to the taper/conical surfaces in the half-nut halves and in the locking block, the two halves may be forced together upon upward movement until they engage the lead screw and act as a single drive nut. The shifting carriage thus operates in this mode as though it were permanently attached to the lead screw, raising and lowering with no further action upon the half-nut assembly required. When it is desired to disengage the half-nut (i.e., to hold the associated chamber in place) the rotation of the crank in a locking direction may cause the locking grips 564 to engage the locking teeth on the guide rods and, at the same time, the lead screw may be reversed to allow the locking grip teeth to engage the guide rods. In addition, the actuator crank causes a lowering of the actuating tube 574 and the continued rotation of the lead screw may cause the half nut assembly to lower and disengage from the lead screw. The half-nut assembly thus provides selective engagement and disengagement of the shifting carriage with the lead screw 555 and is coordinated with actuation of the locking grips 564 such that the shifting carriage may be unlocked from the guide rods 558 and engaged with the lead screw 555 simultaneously or in a single operation. Alternatively, the locking mechanism and shifting mechanism may be actuated by separate actuators, each under appropriate control by a respective control system, to coordinate their operation. The dimensions of the half-nut may be selected to ensure that the half-nut can completely disconnect while also staying within the lower section of the locking block conical surface to ensure the half nut assembly remains centered at all times.

The above configuration provides for a single lead screw to raise and lower two or more shifting carriages mounted thereon independent of one another. Thus, the shifting carriages 550.1 and 560.1 (FIG. 15) can be moved independent of one another using the lead screw motion and appropriate controls for the driving and locking mechanisms in each shifting carriage.

Figure 32:
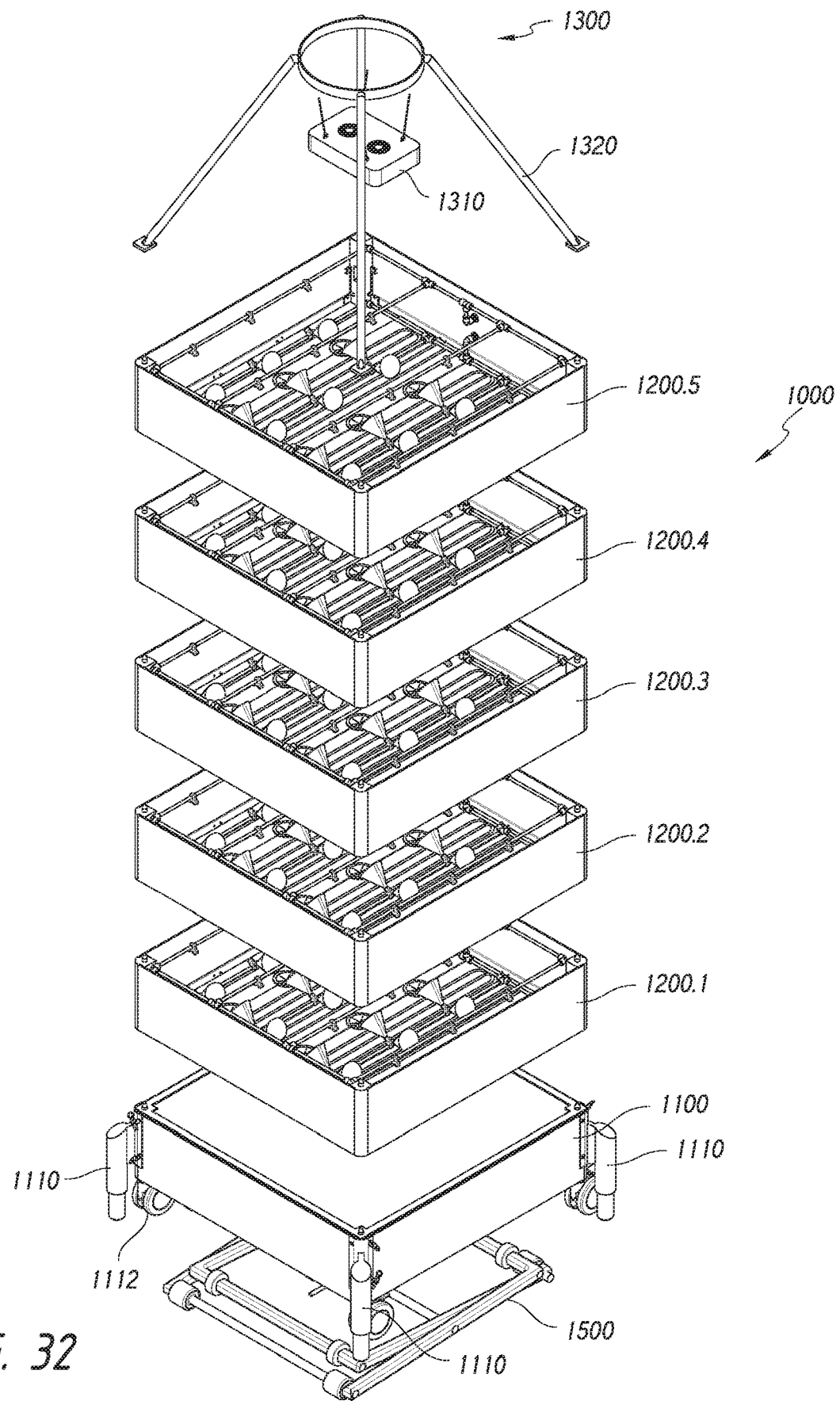
FIGS. 32 and 33 are perspectives showing a second example grow system.
Figure 33:
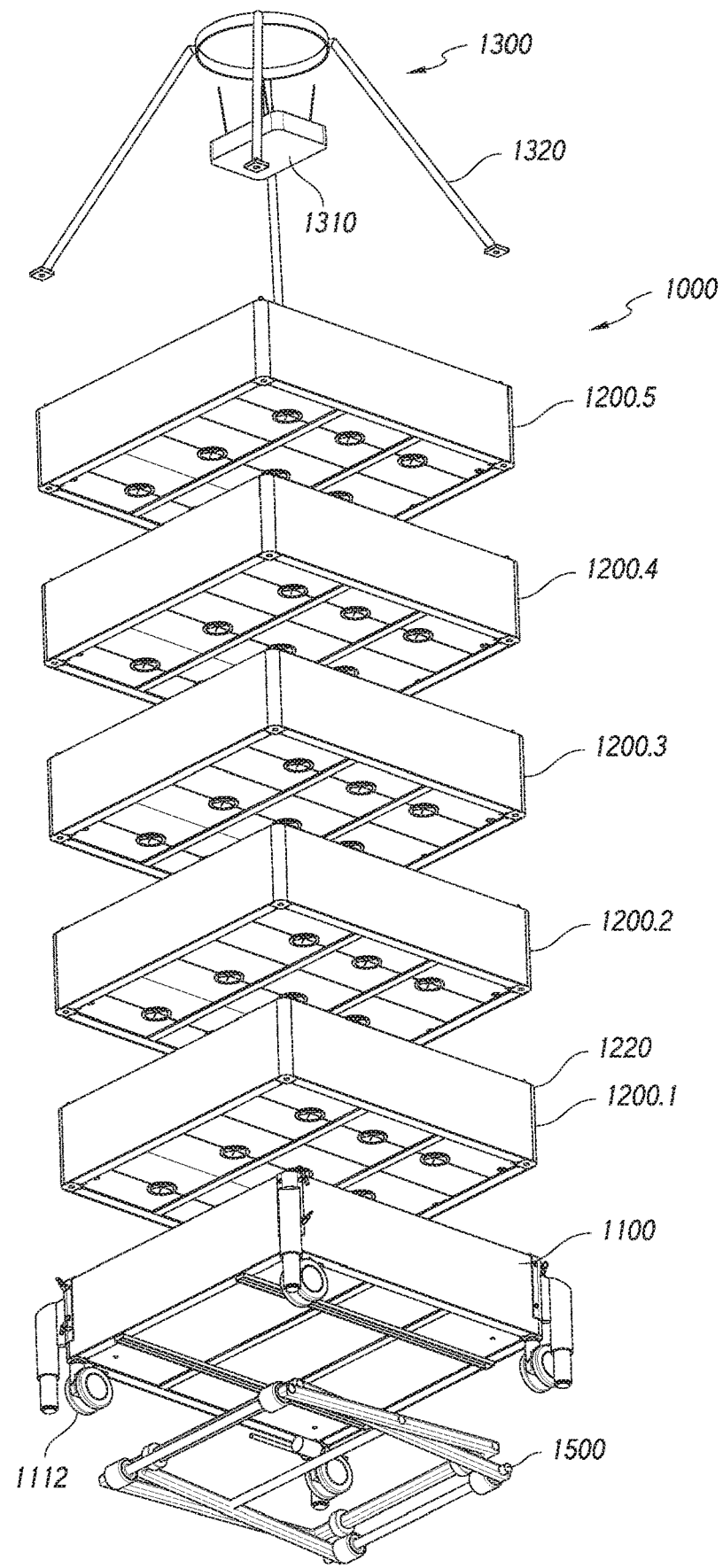

FIGS. 32-45 illustrate a second example grow chamber system according to aspects of the disclosure and which may be used to perform the process described above relative to FIGS. 14.1 and 14.2. Referring particularly to FIGS. 32 and 33, grow chamber system 1000 may include a base or chamber 1100 and a number of modular grow chambers (five are shown) 1200.1, 1200.2, 1200.3, 1200.4 and 1200.5. A top framework 1300 may be provided on a top one of the chambers 1200.5 and may include an energy source 1310 suspended therefrom as well as a number of support members 1320 fastened to the corners of the upper chamber 1200.5 and extending above the upper chamber. In addition, other supporting structure may be provided, such as the gridwork shown in the system in FIG. 1. A shifting device 1500, which may be a scissor-type shifting device, maybe disposed beneath the base 1100. Base 1100 may have telescoping support members 1110 (partially illustrated, see FIGS. 43 and 44 for full illustrations) secured to support columns at the corners of the base 1110. Rollers or casters 1112 may be mounted on the bottom of each corner support column.

Figure 34:
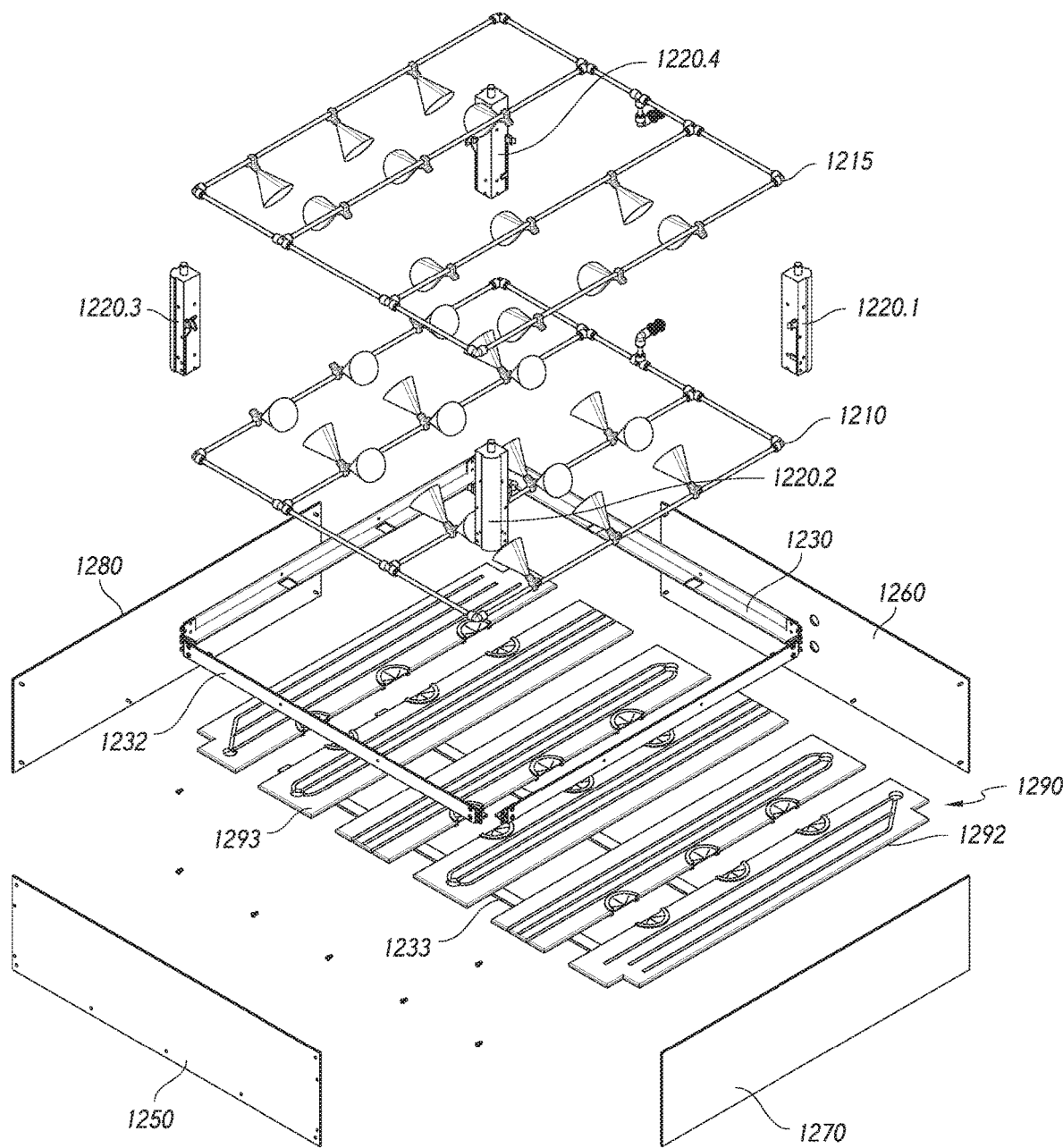
FIG. 34 is an exploded perspective showing construction of a grow chamber used in the system of FIGS. 32 and 33.
Figure 41:
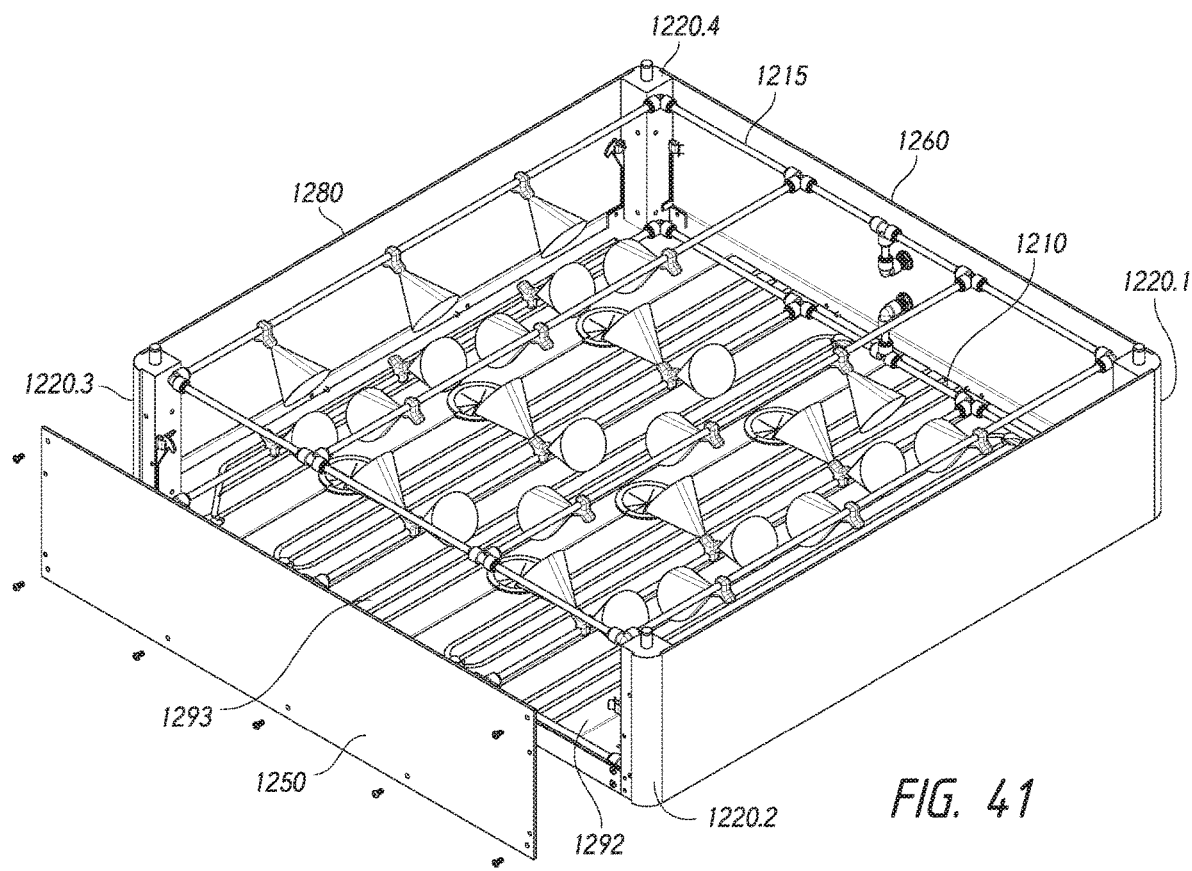
FIG. 41 is a perspective of an assembled grow chamber used in the system of FIGS. 32 and 33.

A second example modular chamber construction is illustrated in the exploded view in FIG. 34 and in the assembled view in FIG. 41. A lower frame 1230 is defined by a number (in this case four) channel members 1232 each of which is secured to a lower portion of the corner support columns 1220.1, 1220.2, 1220.3 and 1220.4. The lower frame members 1232 and corner support columns 1220 define a floor space, which supports a number of floor panels, including inner floor panels 1293 and end floor panels 1292, which have a cutout 1294 to fit around the corner support columns 1220. A number of floor support cross members 1233 may extend between two of the lower frame members 1232 and in a direction transverse to the major dimension of the floor panels to provide additional support thereto. A front panel 1250, rear panel 1260, right side panel 1270 and left side panel 1280 may be secured to respective lower frame members 1232 and to the corner support columns 1220 using threaded fasteners or other fastening devices, such as quick connect fasteners. FIG. 34 also illustrates an upper and lower nutrient distribution framework 1210 and 1215, which may include conduits for distributing nutrients to a number of spray nozzles within the chamber.

Figure 35:
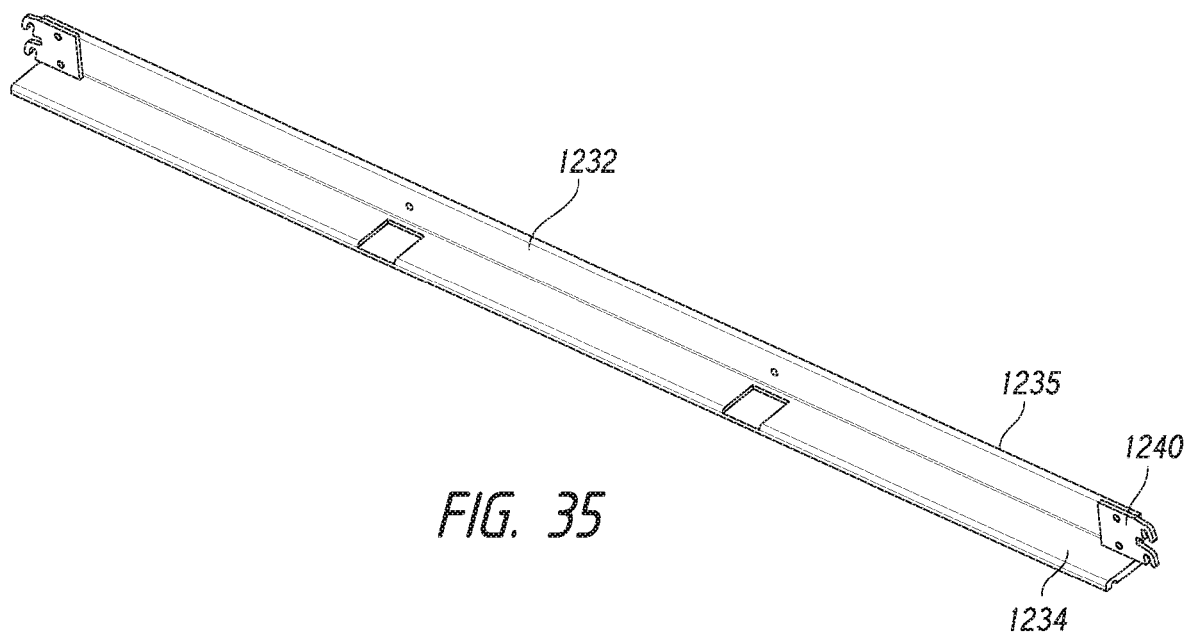
FIG. 35 is a perspective of a lower chamber frame component used in construction of the grow chambers used in the system of FIGS. 32 and 33.
Figure 36:
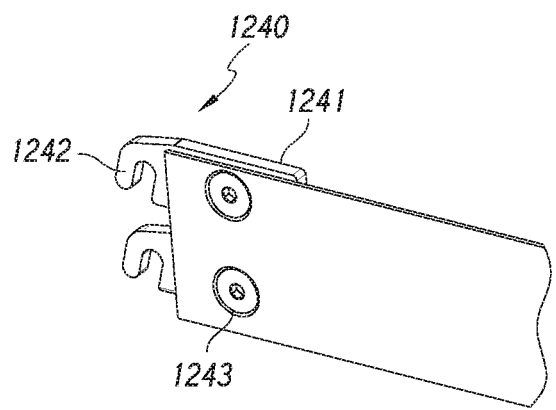
FIG. 36 is a detailed perspective of a fastening configuration for the frame component of FIG. 35.

FIGS. 35 and 36 illustrate details of a lower frame member 1232 and an example connecting feature for releasably securing the lower frame members 1232 to the support columns 1220. Frame member 1232 may be a generally L-shaped angled member having a horizontally extending floor support member with a vertically extending fastening tab 1240 extending from each end thereof. A vertical wall 1235 may extend between and be fastened to the fastening tabs 1240 with threaded fasteners 1243, welding or other fastening features. Fastening tabs 1240 include a number (in this case two) of fastening channels or hooks 1242 extending in a downward direction to engage and receive fastening pins on the support columns as will be explained. As will be recognized, the horizontal member 1234 may be formed from a stamping operation in which fastening tabs are formed and then bent at a 90-degree angle to the orientation shown in FIG. 35.

Figure 37:
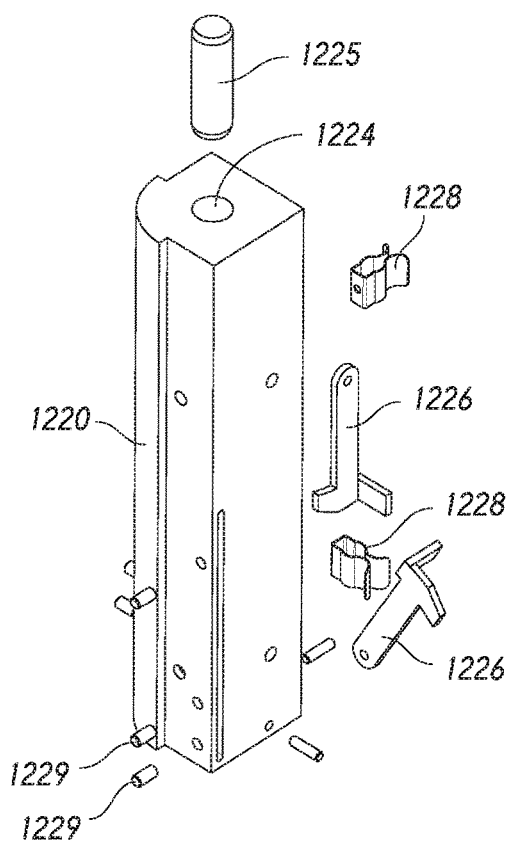
FIGS. 37 and 38 are exploded perspective views of a support column for the grow chambers used in the system of FIGS. 32 and 33.
Figure 38:
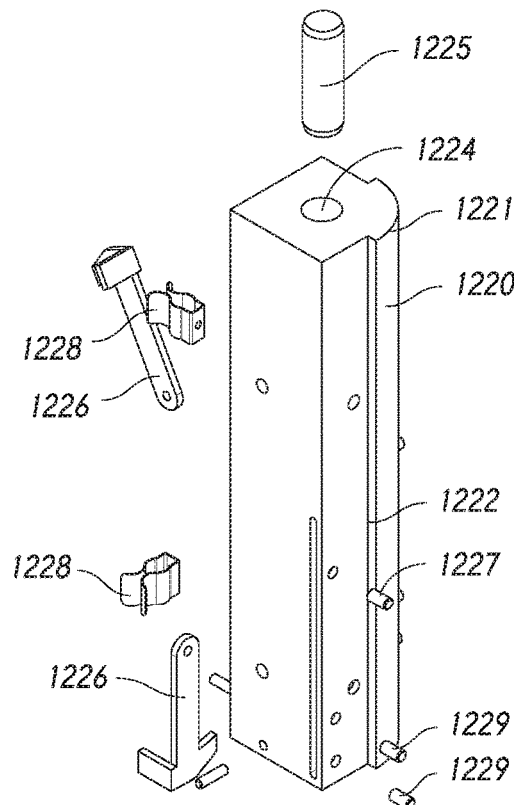
Figure 39:
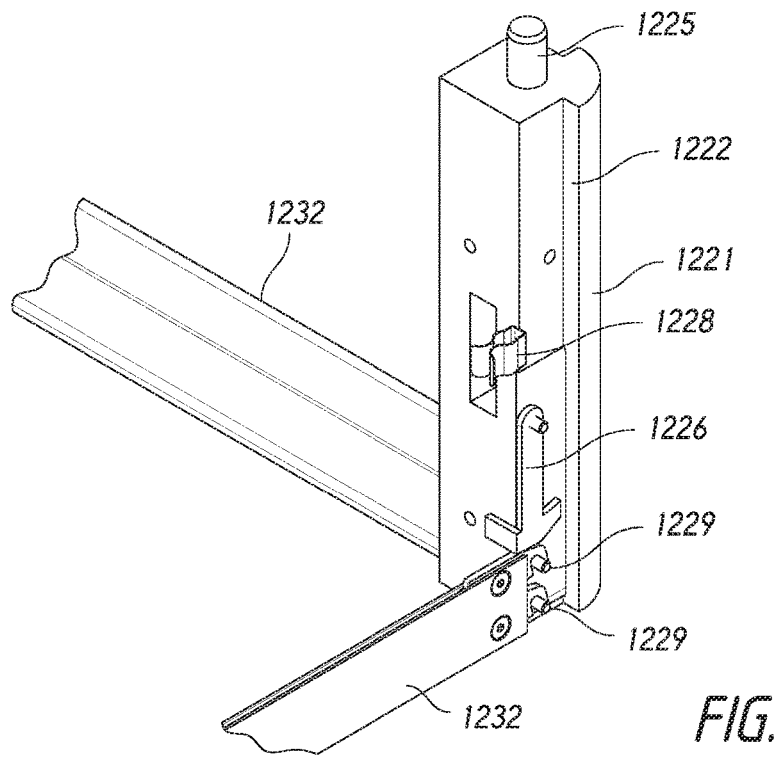
FIG. 39 is a detailed view showing the fastening details of the frame component of FIG. 35 and the support column of FIGS. 37 and 38.
Figure 40:
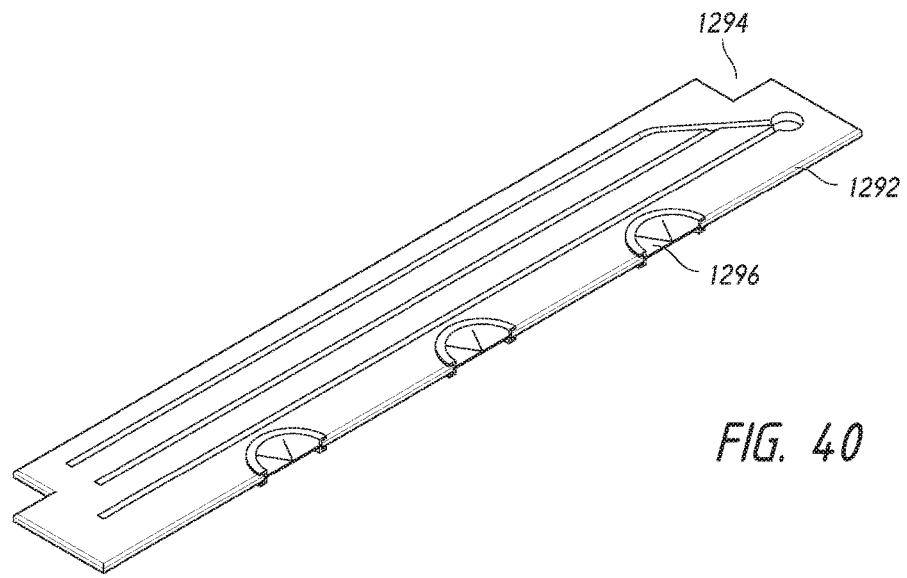
FIG. 40 is a perspective of a floor panel used in the grow chambers of the system of FIGS. 32 and 33.

FIGS. 37-39 illustrate details of the corner support columns 1220 and how they are fastened to the lower frame members 1232. Support columns 1220 may include a rounded outer corner 1221 extending to a panel shoulder 1222 for providing a flush mount of the front, back or side panels. Each support column 1220 may include a pair of locking levers 1226, which are mounted on pivot pins 1227 and may pivot (swing) from a stored position, in which they are secured in a spring biased clip 1228 to a locking position (shown in FIG. 39) in which the end of the locking levers 1226 engages the fastening tabs 1240 of the lower frame members 1232 to secure the position of the lower frame members and the engagement of locking pins 1229 in the respective channels of the fastening tabs 1240, thus securing the frame member 1232 to the support columns 1220. In accordance with aspects of the disclosure, an alignment pin 1225 is provided in a recess or aperture 1224 in the top of the support column 1220 for engaging an adjacent recess in the support column of an adjacent (upper) chamber.

In contrast to the modular chamber construction described above with regard to FIGS. 1-13, in this example the construction utilizes only a lower frame defining a floor space and utilizing the support columns to interconnect the lower frame constituent members.

The lower frame connections include a high strength quick connect feature, which enhances the structural strength provided by the lower chamber frame and support columns such that an upper chamber frame (as in the system of FIGS. 1-13) may be eliminated or optional. This configuration also provides enhanced access to the chamber interior. Moreover, the corner support columns are disposed inward compared to the implementation of FIGS. 1-13, and thus partially occupy the chamber interior and provide a smooth outer perimeter of the grow chamber to enhance cleaning and appearance.

Figure 42:
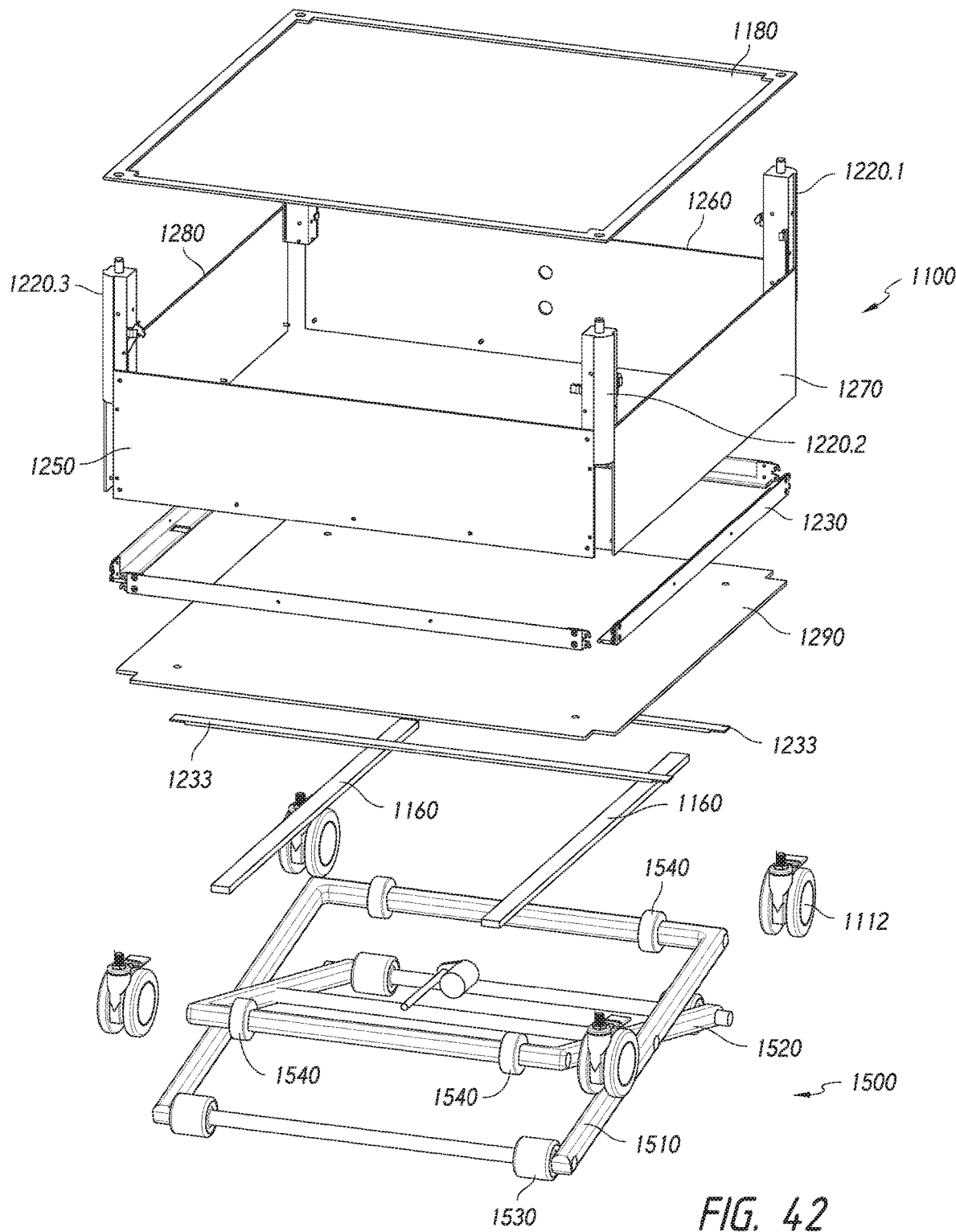
FIG. 42 is an exploded perspective of a base suitable for use in the system of FIGS. 32 and 33.

FIG. 42 is an exploded view of a base 1100 and a shifting device 1500. As will be recognized, the lower frame 1230, cross-members 1233, support columns 1220 and front, back and side panels 1250, 1260, 1270 and 1280 may be constructed similarly to the chamber construction described above with regard to FIGS. 32-40. However, a solid floor panel 1190 may be utilized instead of the floor panels 1292, 1293 (FIGS. 34 and 41) in order to provide a smooth surface on the underside of the chamber for interfacing with a lift assembly. Moreover, a drip tray 1180 may be secured to the top of the base 1100 to collect liquids that may drip from the chamber stack above.

Figure 45:
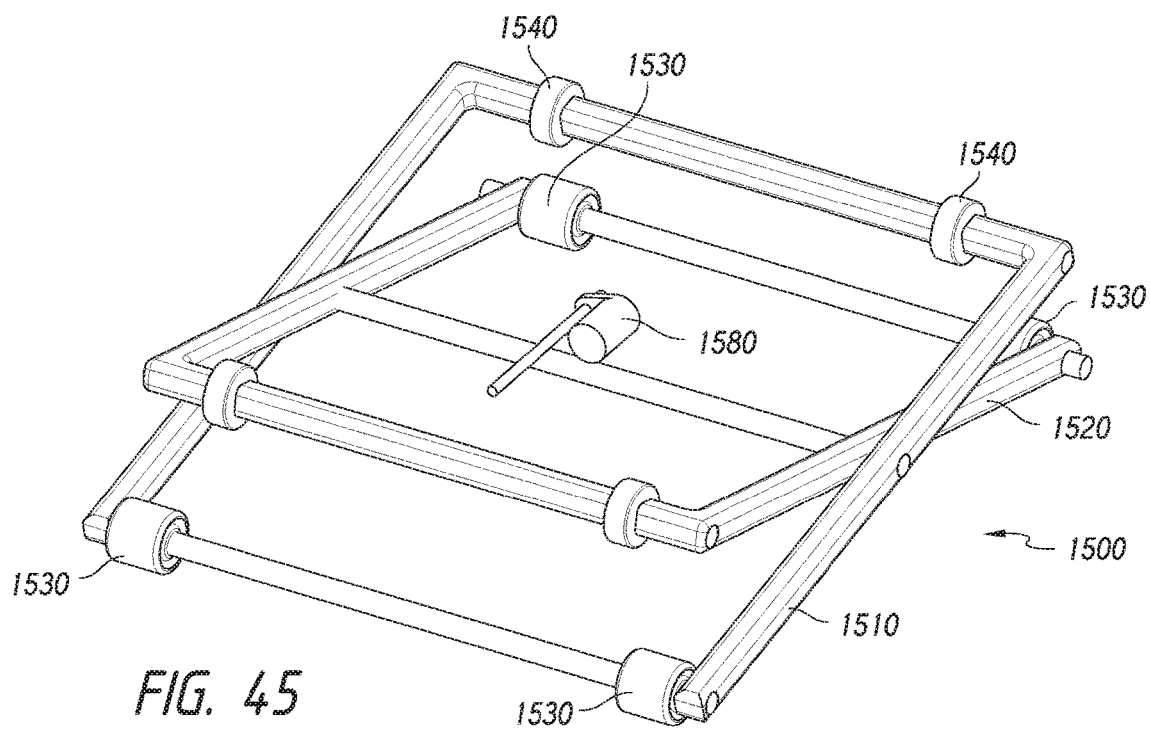
FIG. 45 is a perspective of a shifting device that may be used to elevate or lower a chamber in the system of FIGS. 32 and 33.

Referring additionally to FIG. 45, shifting device 1500 may be a scissor-type shifting assembly with an outer frame 1510 and an inner frame 1520 pivotally connected to one another. Inner frame 1510 and outer frame 1520 may have floor roller elements 1530 to engage a floor surface. Inner frame 1510 and outer frame 1520 may also include chamber floor engaging rollers 1540, which may engage the floor 1190 of the chamber 1100. A pair of reinforcing bars 1160 may extend across the chamber floor and between two of the lower frame members 1230 to provide structural strength to the base and to prevent deformation during shifting by the shifting device. The reinforcing bars 1160 may be spaced in such a manner that they also function as guides for the chamber floor engaging rollers 1540. An actuator 1580, which may be a motor driven lead screw to push and pull upper cross members of the inner and outer frame apart or together to adjust the height of the shifting device 1500.

Figure 43:
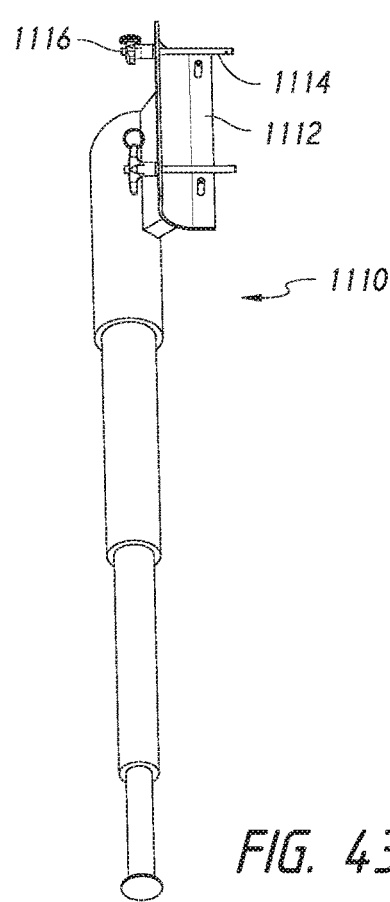
FIGS. 43 and 44 are perspective views of a telescoping external support for supporting a grow chamber stack.
Figure 44:
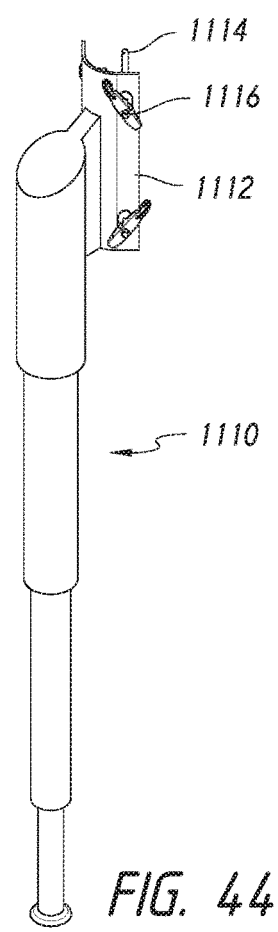

FIGS. 43 and 44 illustrate details of a telescoping/adjustable support 1110 that may be quickly and securely fastened to each of the corner support columns 1220 in order to maintain the vertical position of a portion of the chamber stack, as in step 1420 of the process described relative to FIGS. 14.1 and 14.2. Each support 1110 may include a bracket 1112 which is shaped to engage the outer surface of the support columns 1220 on a selected chamber. Quick-release pins 1114 with handles 1116 may be used to engage holes on the support columns 1220 to thereby fasten the supports 1110 to respective ones of the four support columns on a given chamber. In this manner, the selected chamber and the chambers above it may be supported in a vertical position. Then, the chambers beneath the supported stack may be lowered using the shifting device 1500 a sufficient distance that the alignment pins in the support columns are clear from the recesses in the support columns above them, and removal of the chamber, after severing the plant section as needed, may occur as in step 1424 in the process of FIGS. 14.1 and 14.2.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents.

The invention claimed is:

1. A system for managing growth of at least one plant comprising:
    a base; the base including at least two base support columns;
    a first chamber supported on the base, the first chamber including at least two first chamber support columns, the first chamber support columns, having a first chamber support column alignment projection extending therefrom;
    a first chamber lower frame extending between each of the first chamber support columns;
    at least two first chamber floor panels supported on the first chamber lower frame, the first chamber floor panels forming a first chamber floor, each first chamber floor panel having a first chamber floor panel recess, the floor panel recesses arranged to form at least one floor passage when the first chamber floor panels are positioned adjacent one another on the first chamber lower frame;
    a plurality of removable first chamber side panels extending between the first chamber support columns and first chamber lower frame members, the first chamber side panels and first chamber floor panels defining a first chamber interior space;
    a second chamber supported on the first chamber, the second chamber including at least two second chamber support columns, the second chamber support columns each having a recess for receiving a respective one of the first chamber support column alignment projections extending therefrom;
    a second chamber lower frame extending between each of the second chamber support columns;
    at least two second chamber floor panels supported on the second chamber lower frame, the second chamber floor panels forming a second chamber floor, each second chamber floor panel having a second chamber floor panel recess, the second chamber floor panel recesses arranged to form at least one second chamber floor passage when the second chamber floor panels are positioned adjacent one another on the second chamber lower frame;
    a plurality of removable second chamber side panels extending between the second chamber support columns, and second chamber upper frame members, the second chamber side panels and second chamber floor defining a second chamber interior space;
    the second chamber floor enclosing the first chamber interior space to provide a closed environment within the first chamber for supporting a controlled environment around a plant section extending therein between a first chamber plant interface and a second chamber plant interface.

2. The system of claim 1, wherein the first chamber lower frame defines a first chamber floor space, and wherein the at least two first chamber floor panels are supported on the first chamber lower frame in the first chamber floor space.

3. The system of claim 1, further comprising a plant canopy support secured to at least one of the chambers.

4. The system of claim 1, wherein at least one of the base support columns, first chamber support columns or second chamber support columns includes a shifting interface adapted to interface with an external shifting device.

5. The system of claim 4, wherein the shifting interface comprises a slot.

6. The system of claim 1, wherein the first chamber lower frame defines a floor space, wherein the at least two first chamber support columns are positioned adjacent to the floor space.

7. The system of claim 1, wherein the first chamber lower frame defines a floor space, wherein the first chamber floor panels are of a standardized size.

8. The system of claim 7, wherein the floor panels define at least two recesses, which form respective passages when the floor panels are placed in floor space, the passages being adapted to allow a respective plant to pass therethrough.

9. The system of claim 8, wherein each of the recesses are adapted to engage with the plant interface.

10. The system of claim 1, wherein the floor panels are of a standardized size and wherein the first lower chamber frame defines a floor space that can be completely occupied by the floor panels.

11. The system of claim 1, further comprising a canopy assembly for supporting a plant shoot section.

12. The system of claim 1, wherein the first chamber further comprises a first upper chamber frame supported on the first chamber support columns, and wherein the first chamber further comprise an intake panel and an exhaust panel removably secured to the first chamber and adapted to fit within a panel space defined by the first lower chamber frame, first upper chamber frame and first chamber support members.

13. The system of claim 1, wherein at least one of the first chamber and the second chamber comprise at least one removable panel secured to the first lower chamber frame for permitting access to an interior thereof.

14. The system of claim 13, wherein the at least one removable panel extends between two of the first chamber support columns.

\* \* \* \* \*